(12) United States Patent
Namihira et al.

(10) Patent No.: US 10,160,668 B2
(45) Date of Patent: Dec. 25, 2018

(54) DEVICE AND METHOD FOR TREATING ORGANIC-MATERIAL-CONTAINING WATER

(71) Applicant: JAPAN OIL, GAS AND METALS NATIONAL CORPORATION, Minato-ku, Tokyo (JP)

(72) Inventors: Takao Namihira, Kumamoto (JP); Hiroyuki Sekino, Tokyo (JP); Kazuyuki Kawamura, Tokyo (JP); Yosuke Kunishi, Tokyo (JP)

(73) Assignee: JAPAN OIL, GAS AND METALS NATIONAL CORPORATION, Minato-ku, Tokyo (JP)

( * ) Notice: Subject to any disclaimer, the term of this patent is extended or adjusted under 35 U.S.C. 154(b) by 193 days.

(21) Appl. No.: 15/312,318

(22) PCT Filed: May 19, 2015

(86) PCT No.: PCT/JP2015/064249
§ 371 (c)(1),
(2) Date: Nov. 18, 2016

(87) PCT Pub. No.: WO2015/178356
PCT Pub. Date: Nov. 26, 2015

(65) Prior Publication Data
US 2017/0081221 A1    Mar. 23, 2017

(30) Foreign Application Priority Data

May 20, 2014    (JP) ................. 2014-104021

(51) Int. Cl.
*C02F 1/46*    (2006.01)
*E21B 43/34*    (2006.01)
(Continued)

(52) U.S. Cl.
CPC .............. *C02F 1/4608* (2013.01); *B03C 1/01* (2013.01); *B03C 1/02* (2013.01); *B03C 11/00* (2013.01);
(Continued)

(58) Field of Classification Search
None
See application file for complete search history.

(56) References Cited

U.S. PATENT DOCUMENTS

| 6,695,953 B1 * | 2/2004 | Locke ................. C02F 1/4608 110/346 |
| 2008/0023401 A1 | 1/2008 | Arato et al. |
| 2010/0240943 A1 * | 9/2010 | Solnik ................. B01J 19/088 588/311 |

FOREIGN PATENT DOCUMENTS

| JP | 11-169147 A | 6/1999 |
| JP | 2003-144805 A | 5/2003 |

(Continued)

*Primary Examiner* — Kishor Mayekar
(74) *Attorney, Agent, or Firm* — Christensen O'Connor Johnson Kindness PLLC

(57) ABSTRACT

The present invention seeks to decompose and remove various types of organic materials contained in oilfield water by one operation. To this end, this method for treating oilfield water is provided with: a step for obtaining primary treated water containing organic material by removing the solid content and oil content from oilfield water; and a step for decomposing the organic material by exposing the primary treated water to discharge plasma, wherein the discharge plasma is generated by a nanosecond pulse power source for outputting a pulse having a pulse width of 10 ns or less.

3 Claims, 21 Drawing Sheets

(51) Int. Cl.
*B03C 1/01* (2006.01)
*B03C 1/02* (2006.01)
*B03C 11/00* (2006.01)
*C02F 101/32* (2006.01)
*C02F 103/10* (2006.01)
*E21B 43/26* (2006.01)
*C02F 1/48* (2006.01)
*C02F 1/52* (2006.01)
*C02F 103/36* (2006.01)

(52) U.S. Cl.
CPC .......... *E21B 43/34* (2013.01); *B03C 2201/02* (2013.01); *C02F 1/488* (2013.01); *C02F 1/5236* (2013.01); *C02F 2101/32* (2013.01); *C02F 2103/10* (2013.01); *C02F 2103/365* (2013.01); *C02F 2201/46175* (2013.01); *E21B 43/26* (2013.01)

(56) References Cited

FOREIGN PATENT DOCUMENTS

| | | | |
|---|---|---|---|
| JP | 2004-255290 | A | 9/2004 |
| JP | 2007-283203 | A | 11/2007 |
| JP | 4073240 | B | 2/2008 |
| JP | 2009-241055 | A | 10/2009 |
| JP | 2011-161412 | A | 8/2011 |
| JP | 2012-035199 | A | 2/2012 |
| JP | 2012-040536 | A | 3/2012 |
| JP | 5098334 | B | 10/2012 |
| JP | 2012-236130 | A | 12/2012 |
| JP | 2012-236131 | A | 12/2012 |
| WO | 2006/049149 | A1 | 5/2006 |
| WO | 2010/074195 | A1 | 7/2010 |

\* cited by examiner

DEVICE AND METHOD FOR TREATING ORGANIC-MATERIAL-CONTAINING WATER

TECHNICAL FIELD

The present invention relates to a method and apparatus of treating organic-substance-containing water, and more particularly, to a method and apparatus of decomposing water containing hardly-degradable organic substances. In an exemplary embodiment of the present invention, the water containing hardly-degradable organic substances is oilfield water.

BACKGROUND ART

In many cases, oilfield water produced in oil fields or gas fields includes hardly-degradable water-soluble organic substance (phenol, polycyclic aromatic hydrocarbons, or the like) or heavy metals as well as oil. Releasing of such oilfield water in an untreated state to the environment should be avoided. How to treat the oil, heavy metals, water-soluble organic substance, or the like contained in the oilfield water is an important problem.

As methods of removing the oil from oil-containing water, several methods have been proposed.

Patent Document 1 discloses a method where, in an oil-water separation apparatus for removing oil from water to be treated containing the oil, contained oil is emulsified by emulsion generating means or oil phase removing means, the resulting product is added with a magnetic powder and a flocculent to generate magnetic floc, and the magnetic floc is suctioned and separated by a magnetic force and is collected in the atmosphere.

Patent Document 2 discloses a waste water treatment method for crude oil containing exhausted water where, in waste water treatment for crude oil containing exhausted water exhausted from a crude oil mining process or the like, oil floating in a suspension state in the crude oil containing exhausted water is aggregated, precipitated, and separated by using an organic polymer flocculent, and the oil dissolved in the waste water is oxidized and decomposed by using the polymer flocculent and an oxidizing agent.

Patent Document 3 discloses a flocculation magnetic-separation system flocculates oil and solids (including heavy metals) in oilfield water by mixing a flocculent containing magnetic powder into the oilfield water and removes the oil and solids.

These methods can be used as a primary treatment method of removing the oil or the like from the oilfield water.

Even in the case where the oil and solids are removed from the oilfield water, the primarily treated water may contain a large amount of and various types of water-soluble organic substances. Therefore, how to treat these substances is a problem.

Patent Documents 4 and 5 address the problem, "although oil content of oilfield water is removed, a large amount of organic compounds, for example, acetic acid, propionic acid, valeric acid, and the like are still dissolved, and thus, these compounds cause malodor and damage to the environment, so that the removal thereof has been studied" and proposes a treatment method of removing the dissolved organic compounds contained in the oilfield water.

Patent Document 4 discloses a method of removing organic compounds dissolved in oilfield water where oilfield water obtained by separating crude oil from a mixture of the crude oil and brine is allowed to be in contact with an absorbent to absorb and remove the organic compounds dissolved in the oilfield water, and the absorbent is reproduced by desorbing the absorbed compounds from the absorbent.

Patent Document 5 discloses an oilfield water treatment method where oilfield water obtained by separating oil from crude oil water produced in mining of crude oil is allowed to be in contact with zeolite of which molar ratio of $SiO_2/Al_2O_3$ is in a range of 100 to 200, so that dissolved organic compounds contained in the oilfield water are absorbed and removed.

Main purposes of the aforementioned methods in the related art are to separate and remove the dissolved organic substances by using the absorbent, and thus, there is a need to further treat the removed organic substance. In Patent Document 4, vaporization and removal of volatile organic compounds using an aeration apparatus is performed as a pre-treatment of the adsorption treatment, and heating and reproduction of the absorbent and combustion of the organic compounds in the exhausted gas is performed as a post-treatment of the adsorption treatment.

The present inventors have focused on discharge for the purpose of collectively treating oilfield water containing various types of organic substance (various types of water-soluble organic substances and various types of volatile organic substances), and seek to treat the oilfield water by an approach different from the method of adsorbing and removing the dissolved organic products.

In particular, since the oilfield water contains various types of organic substances according to mining sites, it is advantageous that these organic substances are collectively decomposed and removed.

Water treatment using discharge has already been known, and such water treatment is disclosed in, for example, Patent Document 6, Patent Document 7, and Patent Document 8. However, higher efficient treatment using a more compact, simpler apparatus is desired. In addition, but not limited to the oilfield water, it is desired to efficiently treat organic substances of water containing various types of hardly-degradable organic substances.

Patent Document 1: JP 2003-144805 A
Patent Document 2: JP 2004-255290 A
Patent Document 3: JP 2012-40536 A
Patent Document 4: JP 5098334 B
Patent Document 5: JP 2007-283203 A
Patent Document 6: JP 4073240 B
Patent Document 7: JP 2009-241055 A
Patent Document 8: JP 2012-236131 A

SUMMARY OF INVENTION

An aim of the present invention is to provide a device and a method for decomposing and removing organic materials from water containing hardly-degradable organic substances with a simple construction.

A first technical means according to the present invention relates to a device for treating organic material containing water comprising:

an electrode pair including an outer first electrode and a second electrode extended in an inner space of said first electrode along the longitudinal direction of said first electrode;

a pulse power source applying a high pulse voltage to said electrode pair;

an inlet and an outlet for water to be treated, said inlet and outlet being in communication with the inner space of the first electrode;

an inlet and an outlet for oxygen containing gas, said inlet and outlet being in communication with the inner space of the first electrode;

said pulse power source is a nanosecond pulse power source which generates a pulse having a pulse width of 10 ns or less and a voltage rising speed of 10 kV/ns or more wherein organic materials contained in said water which sprayed into the inner space from the inlet are decomposed by exposing to a nanosecond pulse discharge plasma generated under an oxygen atmosphere.

In one aspect, the first electrode is a cylindrical electrode and the second electrode is a line-shaped or rod-shaped center electrode which extends at a center of the cylindrical electrode along a longitudinal direction of the cylindrical electrode.

In one aspect, a transmission line of a pulse output from the pulse power source is electrically connected to the second electrode so that a streamer propagates radially from the second electrode to the first electrode to provide a plasma discharge, and the organic materials contained in the water to be treated introduced from the inlet are exposed to the plasma discharge and decomposed.

The voltage rising speed of 10 kV/ns or more can be obtained, for example, by an applied voltage of 100 kV and a rising time of 10 ns or less, an applied voltage of 30 kV and a rising time of 3 ns or less, or an applied voltage of 10 kV and a rising time of 1 ns or less.

In the present specification, a pulse width means a full width at half maximum, specifically, a time between a rising point of half the peak value of a pulse and a falling point of half the peak value of a pulse.

According to the present invention, as a pulse width, any value of 10 ns or less (9 ns, 8 ns, 7 ns, 6 ns, 5 ns, 4 ns, 3 ns, 2 ns, 1 ns, or any intermediate value thereof, for example) can be employed.

In one aspect, the inlet and the outlet for the water to be treated are connected via a circulation path.

In one aspect, a reservoir is provided to collect the water supplied to the inner space and the outlet is provided at the reservoir.

Typically, the oxygen containing gas is an oxygen gas or an air.

In one aspect, the inlet and the outlet for the oxygen containing gas are connected via a circulation path, which may reduce an amount of oxygen supplied from an oxygen containing gas source.

In one aspect, the water to be treated is sprayed or sprinkled into the inner space from the inlet.

In one aspect, a two-fluid nozzle provides the inlets for the water and the oxygen containing gas.

In one aspect, oxygen containing gas is sprayed so as to form a vortex along an inner circumferential surface of a cylindrical first electrode. This may prevent the water to be treated adhering to the inner wall of the cylindrical electrode so as to facilitate the circulation of the water to be treated. For example, the oxygen containing gas is ejected from one or more nozzles diagonally downwardly toward the inner surface of the cylindrical electrode. In case of using the two-fluid nozzle, one or more nozzles for forming a vortex may be provided in addition to the two-fluid nozzle.

In one aspect, the organic material containing water may comprise at least two from a water-soluble organic compounds group including formic acid, acetic acid, propionic acid, naphthenic acid, phenols, and polycyclic aromatic hydrocarbons. In many cases, oilfield water may contain the above all compounds in the water-soluble organic compounds group.

The above water-soluble organic compounds are typical examples and organic material containing water as a target of the present invention may contain other water-soluble organic compounds.

In one aspect, the organic material containing water is oilfield water.

In the present specification, the oilfield water comprises flowback water obtained at hydraulic fracturing of shale layers.

In one aspect, the water to be treated is primary treated water obtained by removing an oil content and a solid content from the oilfield water.

Here, the oilfield water is one example of the water to be treated by the present invention, and the present invention can be applied in general to treatment of water containing various types of hardly-degradable organic substances such as produced water associated with coal development, geothermal development and the like and waste water from an oil factory and the like.

A second technical means according to the present invention relates to a device for treating organic material containing water comprising:

an electrode pair of spacedly opposed a first electrode and a second electrode; and a power source for applying a high frequency voltage to said electrode pair;

wherein water to be treated is sprayed into a space between said electrode pair and a distance between said first electrode and second electrode varies in the propagation direction of high frequency voltage signal.

In one aspect, the second electrode extends in an inner space of the first electrode along the longitudinal direction of the first electrode.

In one aspect, the first electrode is an outer cylindrical electrode (including an electrode with varying inner diameter along the longitudinal direction) and the second electrode is a line-shaped or rod-shaped center electrode which extends at a center of the cylindrical electrode.

In one aspect, the high frequency voltage signal is a pulse.

In one aspect, the second electrode has a first end and a second end, a pulse input to the first end side propagates toward the second end, and a distance between an inner circumferential surface of the first electrode and the second electrode is gradually decreased from the first end side along the propagation direction of the pulse.

A more uniform discharge energy can be obtained by decreasing the distance between an inner circumferential surface of the first electrode and the second electrode from the first end side along the propagation direction of the pulse though the energy attenuates in the pulse propagation direction.

In one aspect, the second electrode has a first end and an open second end, a pulse input to the first end side propagates toward the second end, and a distance between an inner circumferential surface of said first electrode and said second electrode is gradually decreased from the first end side in the propagation direction of the pulse down to a predetermined portion of the second electrode, and the distance is then gradually increased from the predetermined portion toward the second end.

A more uniform discharge energy can be obtained by decreasing the distance between an inner circumferential surface of the first electrode and the second electrode from the first end side in the propagation direction of the pulse down to a predetermined portion of the second electrode, and then increasing the distance from the predetermined portion toward the second end, noting that the energy attenuates in the pulse propagation direction and the pulse voltage is inverted and superposed (voltage-reflected) at the second end of the electrode.

In one aspect, the second electrode has a first end and a second end, a pulse input to the first end side propagates toward the second end, and a ratio b/a in an intermediate portion of the second electrode in the longitudinal direction is higher than the ratios b/a in the first end side and the second end side where "a" is an outer diameter of the second electrode and "b" is an inner diameter of the first electrode.

An enhanced electric field can be obtain at a middle portion along the longitudinal direction of the discharge space by setting a ratio b/a in an intermediate portion of the second electrode in the longitudinal direction being higher than the ratios b/a in the first end side and the second end side.

Another technical means according to the present invention relates to a method for treating oilfield water comprising:

removing an oil content and a solid content from the oilfield water to obtain primary treated water containing organic substances;

decomposing the organic materials by exposing said primary treated water to a discharge plasma wherein said discharge plasma is generated by a nanosecond pulse power source providing a pulse having a pulse width of 10 ns or less and a voltage rising speed of 10 kV/ns or more.

In one aspect, the primary treated water is obtained by flocculating an oil content and a solid content included in the oilfield water by mixing a flocculent containing magnetic powder into the oilfield water, followed by removing flocs by magnetic collecting means.

Other conventional methods (including a combination thereof) may be employed to obtain the primary treated water.

In one aspect, the decomposing comprises repeating the steps of:

spraying the primary treated water into a nanosecond discharge plasma;

collecting the primary treated water which is sprayed and exposed to the nanosecond discharge plasma, and spraying the collected primary treated water into the nanosecond discharge plasma.

In one aspect, the primary treated water and the collected primary treated water is sprayed into the nanosecond discharge plasma together with an oxygen containing gas.

According to the present invention, water to be treated containing various types of hardly-degradable substances can be treated by a single device.

In case that the water to be treated is oilfield water, substances contained in the oilfield water and concentration thereof are different according to a particular oilfield. However, the present invention does not depends on the types of organic substances to be treated and decomposed, and can be applied in general to the treatment of the oilfield water.

DETAIL DESCRIPTION

[A] Discharge Treatment Apparatus

Figure 1:
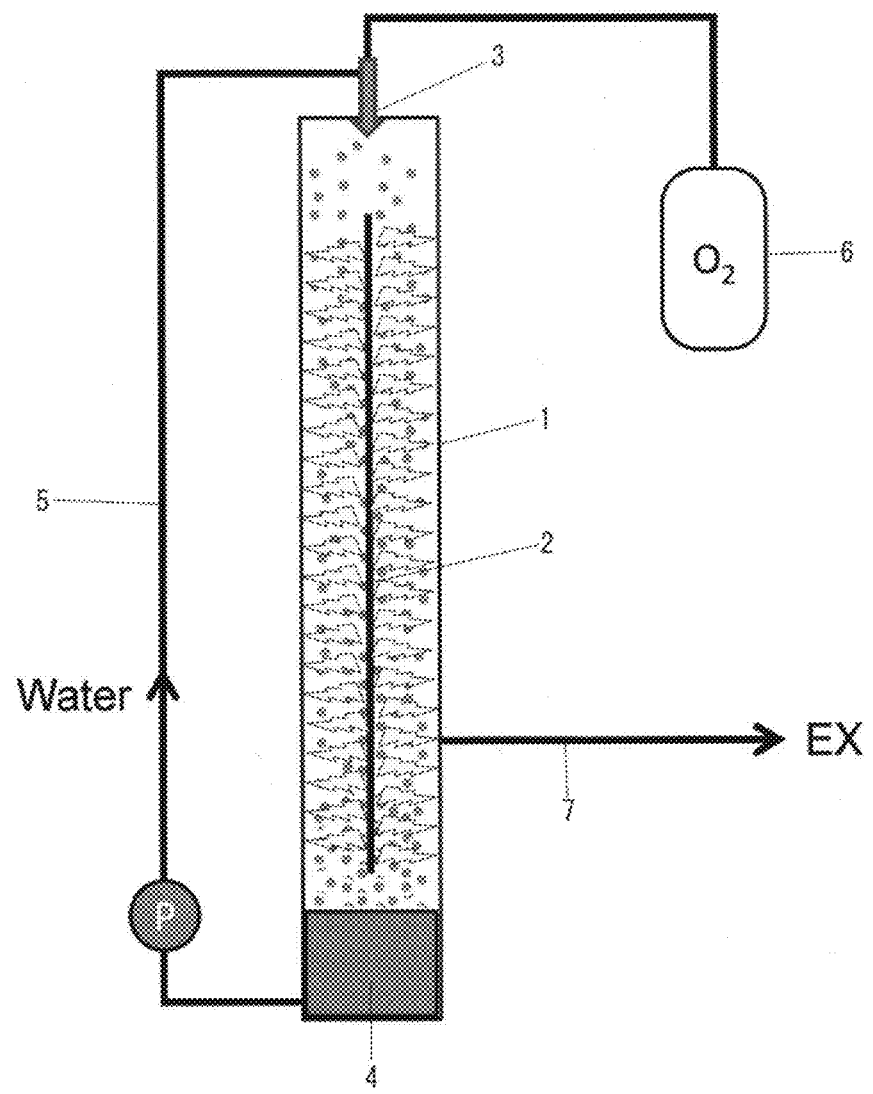
FIG. 1 is a schematic diagram of a discharge treatment apparatus.

FIG. 1 illustrates a schematic diagram of a discharge treatment apparatus. The discharge treatment apparatus is an apparatus for decomposing organic substances by exposing organic-substance-containing water to discharge plasma. A discharge treatment unit is configured with a cylindrical outer electrode 1 and a center electrode 2 provided in a concentric manner inside the outer electrode 1. The outer electrode 1 is grounded, and the center electrode 2 is supplied with a high voltage pulse from the later-described pulse generator. By transmitting a nanosecond pulse generated by the pulse generator to the center electrode 2, the high voltage pulse is applied between the center electrode 2 and the outer electrode 1, and thus, streamer discharge propagates from the center electrode 2 toward the outer electrode 1, so that a nanosecond discharge plasma is generated. The cylindrical outer electrode 1 is arranged in an erect posture so that a cylindrical wall is vertical, and the center electrode 2 also extends vertically.

As a material of the outer electrode 1, stainless steel and brass may be exemplified; and a material of the center electrode 2, tungsten and stainless steel may be exemplified. Of course, the type of a metal material constituting the electrode pair is not particularly limited, but it is appropriately selected by the ordinarily skill in the related art.

In the illustrated embodiment, an outer wall of a treatment container is configured with the cylindrical outer electrode 1, an inlet 3 for water to be treated is provided at an upper end side of the treatment container, and a reservoir unit 4 for the water to be treated is provided at a lower end side of the treatment container. The inlet 3 and the reservoir unit 4 are in fluid communication with each other by a circulation path (including a pump P) 5 to supply the water to be treated stored in the reservoir unit 4 to the inlet 3, so that the water to be treated in the reservoir unit 4 is repetitively exposed to the discharge plasma.

The inlet 3 is configured with a two-fluid nozzle, and oxygen from an oxygen source 6 as an oxygen-containing gas source is introduced into the inlet 3. By the two-fluid nozzle, the water to be treated supplied from the reservoir unit 4 and the oxygen supplied from the oxygen source 6 are mixed and ejected as fine particles into an inner space between the outer electrode 1 and the center electrode 2. The oxygen supplied from the oxygen source 6 has a function of increasing an amount of oxygen-derived radicals (oxygen atoms, ozone, or the like) as well as a function of a gas source for the two-fluid nozzle. In the illustrated embodiment, an exhaust path 7 for exhausting a gas from the inner space is provided to the treatment container, and the exhausted gas (including oxygen) is recirculated to the two-fluid nozzle by a pump, so that a consumed amount of oxygen supplied from the oxygen source 6 may be reduced.

A pulse having a pulse width of 10 ns or less and a voltage rising speed of 10 kV/ns or more is applied from the pulse generator to the center electrode 2, streamers propagates radially from the center electrode 2 toward the outer electrode 1, a nanosecond pulse discharge plasma is generated, particles of the water to be treated ejected from the two-fluid nozzle together with the oxygen fall while exposing to the nanosecond discharge plasma, and the particles are collected in the reservoir unit 4. The collected water is ejected again from the two-fluid nozzle through the circulation path 5, the water falls while exposing to the nanosecond discharge plasma, the water is collected in the reservoir unit 4, the water is ejected from the two-fluid nozzle through the circulation path 5, and the water is exposed to the nanosecond discharge plasma. In this manner, by repetitively treating the water to be treated by using the nanosecond discharge plasma, the organic substances contained in the water to be treated are decomposed.

The nanosecond pulse discharge can solve both factors of low energy efficiency at the time of non-thermal-equilibrium plasma formation by the pulse discharge including mismatch between the pulse power source and heat loss at the time of glow discharge.

In the present invention, the content of the nanosecond pulse discharge is not limited. WO 2010/074195 discloses that, by applying a pulse voltage having a rising time being shorter than a streamer head formation time between electrodes of a discharge unit, a streamer head is allowed to propagate from a center electrode toward an outer electrode, and a duration of the pulse and an applied voltage are selected so that the discharge is ended according to a distance between the electrodes when the propagating streamer head approaches the outer electrode (at least within a time of 1.5 times the streamer discharge time). By performing the discharge by using only the streamer discharge, characteristic impedance of the pulse power source may be matched with impedance between the electrodes at the time of the streamer discharge, and the impedance mismatch between the pulse power source and the discharge electrode caused by a rapid change in impedance at the time of transition from the streamer discharge to the glow discharge can be solved. Therefore, it is possible to improve the efficiency of energy transfer from the pulse power source to a discharge reactor.

The streamer discharge time is "streamer head formation time" + "propagation time of the streamer head between the electrodes". Since the voltage rising time (for example, voltage rising time of 2 ns) of the nanosecond pulse discharge is shorter than the streamer head formation time, the voltage is rising before the propagation of the streamer head between the electrodes is started, and the voltage applied to the electrodes is almost constant when the streamer is propagating. As a result, the streamer head is moved at a constant speed.

[B] Pulse Generator

The pulse generator is a high voltage pulse power source which outputs a nanosecond pulse having a pulse width of 10 ns or less. The pulse generator will be described with reference to FIG. 2. The pulse generator is configured to include a pulse shaping line 8 configured with a distributed constant line, a charging unit 9 for charging the pulse shaping line 8, and a switch 10 for allowing the pulse shaping line 8 to output a pulse.

As the pulse shaping line 8, a triaxial Blumlein line is employed. The triaxial Blumlein line is configured with a cylindrical outer conductor 11, a cylindrical intermediate conductor 12 provided inside the outer conductor 11, and a rod-shaped (cylindrical) center conductor (inner conductor) 13 provided inside the intermediate conductor 12. The outer conductor 11, the intermediate conductor 12, and the center conductor 13 are arranged in a concentric manner to be separated from each other, and thus, spaces are formed between the outer conductor 11 and the intermediate conductor 12 and between the intermediate conductor 12 and the center conductor 13. These spaces are filled with dielectric liquid (constituting a dielectric material of the distributed constant line). In the embodiment, the dielectric liquid is a silicone oil, but any other electric liquid having a predetermined permittivity may be used. The length of the Blumlein line is 500 mm as a non-limitative example. The diameters of the outer conductor 11, the intermediate conductor 12, and the center conductor 13 are 110 mm (inner diameter of the outer conductor), 22 mm (outer diameter of the intermediate conductor), 20 mm (inner diameter of the intermediate conductor), and 4 mm (outer diameter of the center conductor) as non-limitative examples. In the embodiment, these conductors are formed by using brass, but other metals may be used as the conductors.

An inner wall 14 made of an insulating material is formed in the one end side of the cylindrical outer conductor 11 in the longitudinal direction. The one end side of the cylindrical intermediate conductor 12 in the longitudinal direction is supported on the inner wall 14 in a cantilever manner, and the outer end side thereof in the longitudinal direction is opened. The one end side of the center conductor 13 is supported on the inner wall 14. The one end side of the intermediate conductor 12 and the one end side of the center conductor 13 are insulated from each other by using an insulating material.

The charging unit 9 for charging the pulse shaping line 8 is a pulse forming circuit (first-stage pulse generating circuit) configured with, for example, a charging capacitor, a thyratron switch, and a pulse transformer, and the charging unit supplies a pulse voltage to the pulse shaping line 8. As the charging unit 9 (a pulse power source), a micro-second pulse generator (voltage rising/falling time: several tens to several thousands of nanoseconds) can be widely used.

The outer conductor 11 is provided with a charging port 15 located on the inner wall 14, and the charging unit 9 and the intermediate conductor 12 are electrically connected to the outer conductor. The intermediate conductor 12 is charged with pulsed power from the pulse forming circuit. The center conductor 13 and the outer conductor 11 are connected to each other through a charging inductor 16, and the outer conductor 4 is grounded. The charging inductor 16 is an inductor having inductance of, for example, 0.5 to 3.0 µH.

The switch 10 for allowing the pulse shaping line 8 to output a pulse is a high-voltage spark gap switch (SGS) as a high-speed self-closing switch with low inductance. The space between the end portion 17 of the one end side of the outer conductor 11 and the inner wall 14 is filled with an $SF_6$ insulating gas. The one end side of the intermediate conductor 12 protrudes from the inner wall 7 into the space. A first electrode is formed in the end portion of the one end side of the intermediate conductor 12, and a second electrode is formed in the inner surface of the end portion 17 of the one end side of the outer conductor 11. The gap distance between the first electrode and the second electrode is 1 mm. The pressure of the $SF_6$ insulating gas is in a range of, for example, 0.1 to 1.0 MPa. The magnitude of the output voltage from the pulse generator can be adjusted by selecting the pressure value of the $SF_6$. If the gap switch is short-circuited, the outer conductor 11 and the intermediate conductor 12 are conducted.

The outer conductor 11 is longer than the intermediate conductor 12. The other end side of the outer conductor 11 extends over the other end of the intermediate conductor 12, and an insulating end wall 18 is formed on the other end of the outer conductor 11. The one end side of the center conductor 13 is supported on the inner wall 14, and the other end side thereof extends from the other open end of the intermediate conductor 12. The extension portion 130 becomes an energy transmission line from the Blumlein line to the load. The extension portion 130 of the center conductor 13 extends through the inner space of the outer conductor 4 filled with the dielectric liquid in the longitudinal direction of the outer conductor 11 and penetrates the end wall 18 to supply a nanosecond pulse of a high voltage between the cylindrical outer electrode 1 and the center electrode 2 of the discharging unit, so that the nanosecond pulse discharge is performed.

In one embodiment, the unit inductance and unit capacitance of the triaxial Blumlein line are 322 nH/m and 76 pF/m, respectively, and a characteristic impedance of 130 Ω is provided. The length of the Blumlein line is 500 mm, and a pulse having a duration of 5 ns is provided. Since the pulse width (duration) of the pulse formed in the distributed constant line depends on the length of the distributed constant line and the permittivity and permeability of the inner dielectric material thereof, the pulse width can be changed by selecting the length of the Blumlein line. In one embodiment, the triaxial Blumlein line is charged with a negative pulse voltage, and a positive electrode is applied to the load. In addition, the pulse generator may be configured so as to apply a negative electrode to the load. As the energy transmission line from the Blumlein line to the load, a concentric transmission line having characteristic impedance of 130 Ω is used.

[C] Treatment Process for Oilfield Water

A treatment process for the oilfield water as a typical treatment object of the present invention will be described. Since the oilfield water contains oil and solids (including metals), it is preferable that the oil and solids are removed.

Figure 3:
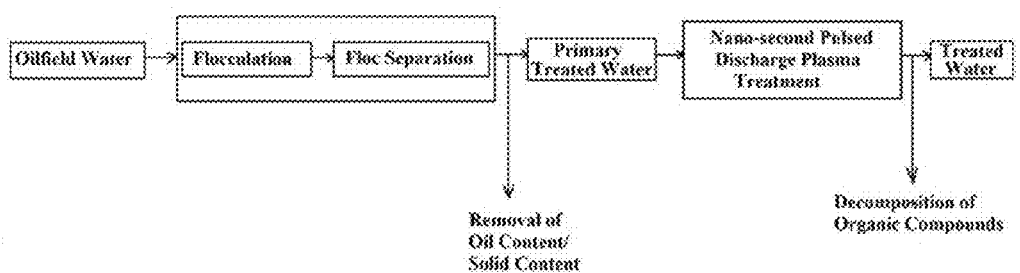
FIG. 3 shows treatment processes of oilfield water.

In the specification, treatment of removing the oil and solids from the oilfield water is called primary treatment. As illustrated in FIG. 3, primarily treated water is obtained by removing the oil and solids from the oilfield water through the primary treatment, and the nanosecond pulse plasma discharge is applied to the primarily treated water to decompose and remove the organic substances contained in the primarily treated water, to obtain the treated water. Typical means of the primary treatment are configured to include a step of flocculating the oil and solids by using a flocculent and a step of separating and collecting floc.

Figure 4:
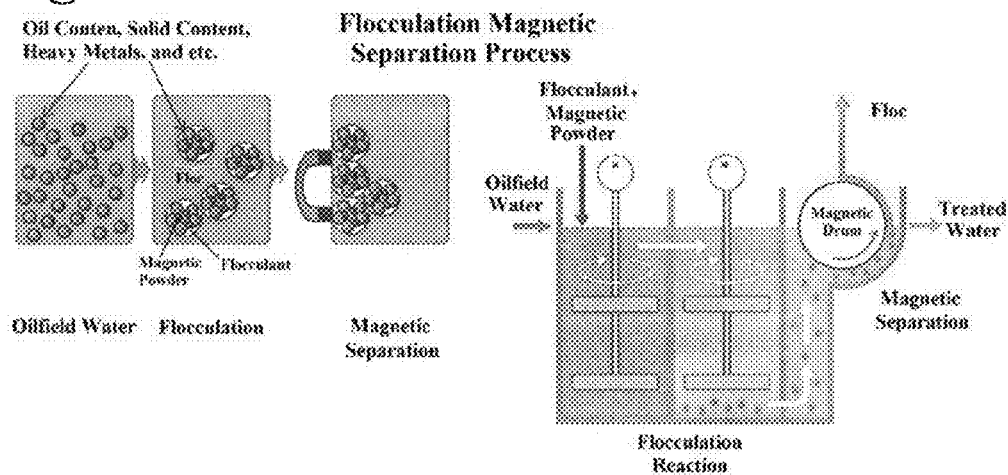
FIG. 4 is a schematic diagram of a flocculation magnetic separation system.

As an example of the primarily treatment means, a flocculation magnetic separation system is illustrated in FIG. 4. The flocculation magnetic separation system flocculates the oil and solids (including heavy metals) in the oilfield water by mixing a flocculent containing magnetic powder into the oilfield water and removes the oil and solids, and the details thereof may be referred to Patent Document 3. In addition, Patent Document 5 discloses means where oilfield water is transported into a flocculation tank, treatment of flocculating suspended solids by aggregation is performed by using a flocculent such as ferric sulfate or polyaluminum chloride or magnetic particles such as magnetite ($Fe_3O_4$) or γ hematite ($Fe_2O_3$), and the oil and the floc is separated from the oilfield water by a rotary filtration device. This method may be used as the primary treatment. As the primarily treatment means, other well-known methods (including a combination of a plurality of methods) may be used. For example, the methods disclosed in Patent Documents 1 and 2 may be used.

[D] Experimental Results

An experiment of the treatment of organic substances contained in the oilfield water was performed. The treatment objects are three types of oilfield water (PW-1, PW-2, and PW-3). As listed in Tables 1, 5, and 8, the oilfield water PW-1 has a relative large amount of propionic acid in comparison with other oilfield water; the oilfield water PW-2 has a relatively large amount of benzene in comparison with other oilfield water; and the oilfield water PW-3 has a relatively large amount of naphthenic acid in comparison with other oilfield water. Each oilfield water contains various types of organic substances. In addition, besides the substances listed in Tables 1, 5, and 8, each oilfield water may contain various types of metals including heavy metals and various types of polycyclic aromatic hydrocarbons. Specifically, some or all of Cd, Pb, As, T-Hg, Cr6, Se, B, F, Cu, Zn, Fe, Mn, T-Cr, 1, and T-S may be contained. As the polycyclic aromatic hydrocarbons, naphthalene, acenaphthene, fluoroene, and phenanthrene are exemplified.

Figure 2:
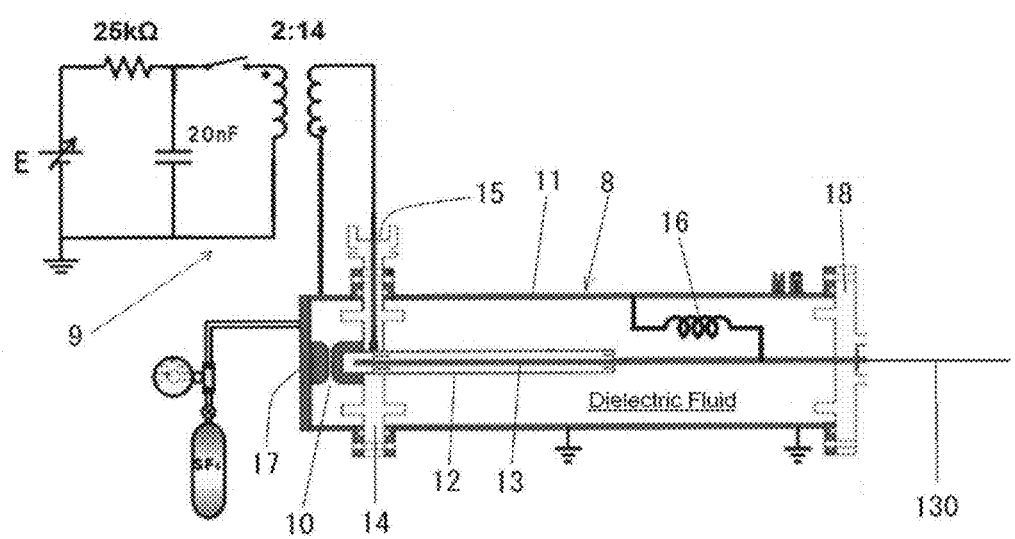
FIG. 2 shows a nanosecond pulse generator.

The treatment method is a nanosecond pulse discharge treatment (treated water-circulation showering method) using the discharge treatment apparatus illustrated in FIG. 1 and the pulse generator illustrated in FIG. 2. By a showering method of spraying the water to be treated from the two-fluid nozzle, the water to be treated can be uniformly applied to discharge treatment. The water to be treated is primarily treated water obtained by treating raw water of the three types of oilfield water (PW-1, PW-2, and PW-3) by the flocculation magnetic separation system illustrated in FIG. 4. As an experiment method, discharge conditions (discharge voltage, voltage time width, discharge frequency, and discharge electrode shape) were fixed except for discharge frequency. The treatment state of organic substance was checked according to COD (chemical oxygen demand, biochemical oxygen demand), and TOC (total organic carbon). The treatment state of the dissolved organic compounds was checked by measuring COD. The treatment state of the organic substance (status of simultaneous treatment of large amount of components) was checked by measuring TOC.

[Experiment 1]

The experiment conditions of Experiment 1 are as follows:
 Treatment Object: PW1
 Amount of Treatment Liquid: 5,000 mL
 Circulation Flow Rate of Treatment Liquid: 200 mL/min
 Treatment Time: 77 hours
 Flow Rate of Oxygen: 5 L/min at 0.2 MPa
 Pulse Width of Applied Pulse: 5 ns
 Voltage of Applied Pulse: 60 kV
 Repetition Frequency of Applied Pulse: 300 pps Main materials contained in the oilfield water PW1 are listed in Table 1.

TABLE 1

Oilfield Water Sample: PW-1

| Classification | Item | Unit | Raw Water | Primary Treated Water |
|---|---|---|---|---|
| Ions | $Cl^-$ | mg/L | 9,380 | 12,000 |
|  | $Br^-$ | mg/L | 67 | 130 |
|  | $SO_4^{2-}$ | mg/L | <100 | 2,100 |
| TPH | Total | mg/L | 88 | 20 |
| Water-Soluble Organic Material | formic acid | mg/L | <50 | <50 |
|  | acetic acid | mg/L | — | 1900 |
|  | propionic acid | mg/L | 350 | 310 |
|  | naphthenic acid | mg/L | 56 | 46 |
|  | phenols | mg/L | 26 | 25 |
| Volatile Organic Material | benzene | mg/L | 9.1 | 4.8 |
|  | toluene | mg/L | 11 | 4.4 |
|  | xylene | mg/L | 5 | 2.3 |
|  | ethylbenzene | mg/L | 0.38 | <0.05 |

Figure 5:
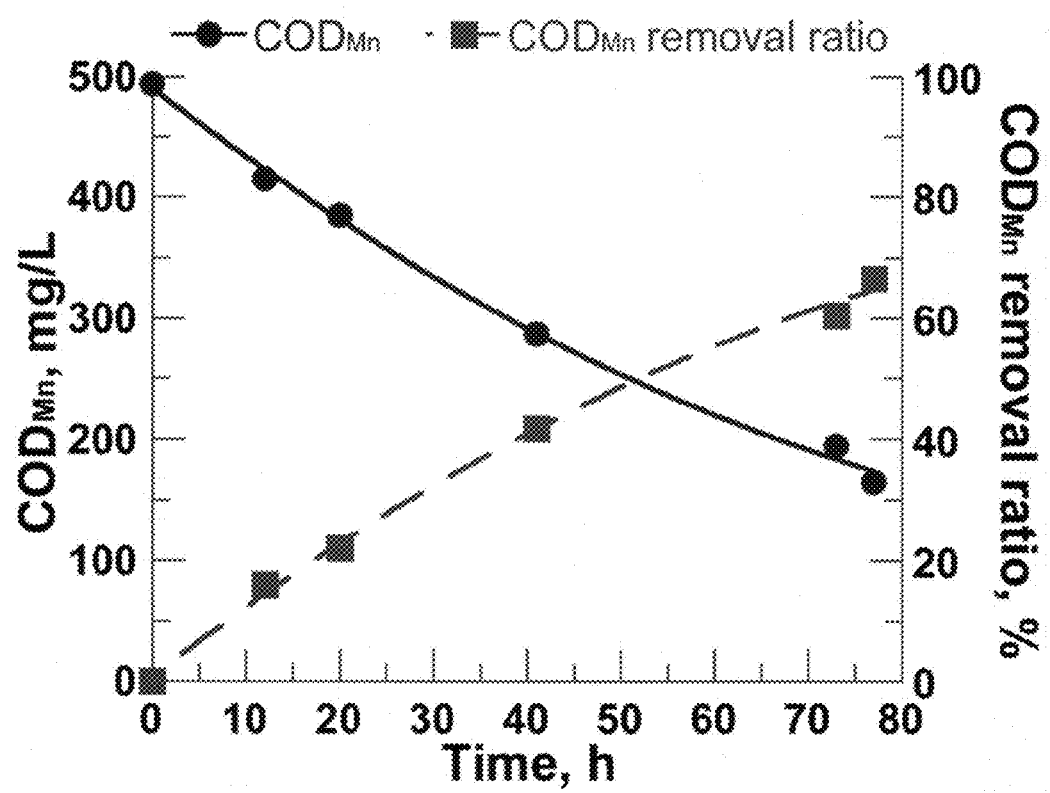
FIG. 5 is a diagram showing treatment results regarding oilfield water PW-1.

Besides, the oilfield water PW-1 contains heavy metals and polycyclic aromatic hydrocarbons. The treatment using the nanosecond pulse discharge plasma was performed on the primarily treated water of the oilfield water PW-1. The $COD_{Mn}$ of the oilfield water PW-1 was measured. The result of measurement is listed in Table 2 and FIG. 5. The reduction of the $COD_{Mn}$ of the oilfield water PW-1 by the nanosecond pulse discharge was demonstrated, and it was observed that the reduction was proportional to time until the reduction ratio reached about 70%.

TABLE 2

| Time, h | $COD_{Mn}$, mg/L | $COD_{Mn}$ removal ratio, % |
|---|---|---|
| 0 | 494 | 0 |
| 12 | 415 | 16.0 |
| 20 | 385 | 22.1 |
| 41 | 287 | 41.9 |
| 73 | 195 | 60.5 |
| 77 | 165 | 66.6 |

[Experiment 2]

Figure 6:
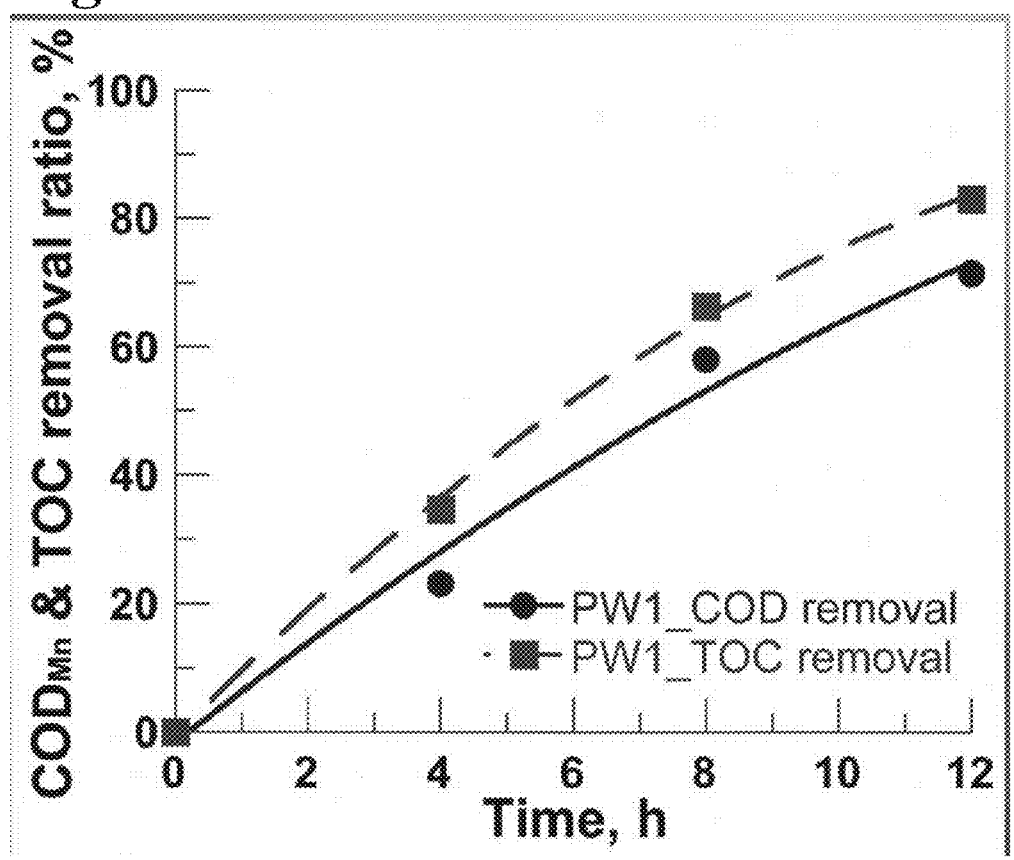
FIG. 6 is diagram showing treatment results (COD removal rate, TOC removal rate) regarding oilfield water PW-1.

The experiment conditions of Experiment 2 are as follows:
 Treatment Object: PW1
 Amount of Treatment Liquid: 600 mL
 Circulation Flow Rate of Treatment Liquid: 400 mL/min
 Treatment Time: 12 hours
 Flow Rate of Oxygen: 5 L/min at 0.2 MPa
 Pulse Width of Applied Pulse: 5 ns
 Voltage of Applied Pulse: 60 kV
 Repetition Frequency of Applied Pulse: 300 pps The treatment using the nanosecond pulse discharge plasma was performed on the primarily treated water of the oilfield water PW-1. The $COD_{Mn}$ and TOC of the oilfield water PW-1 were measured. The result of measurement is listed in Tables 3 and 4 and FIG. 6. The reduction of the COD and TOC of PW-1 by the nanosecond pulse discharge was demonstrated, and it was observed that the reduction was proportional to time until the reduction ratio reached about 70%. In addition, the result using only the showering was that COD: 358→543, TOC: 1,284→1,403. It is considered that water evaporation by the showering occurs. In addition, the treatment of phenols and other undetermined contained materials by the nanosecond pulse discharge was observed by GC-MS (gas chromatography).

TABLE 3

| Time, h | $COD_{Mn}$, mg/L | $COD_{Mn}$ removal ratio, % |
|---|---|---|
| 0 | 358 | 0 |
| 4 | 275 | 23.2 |
| 8 | 150 | 58.1 |
| 12 | 101 | 71.5 |

TABLE 4

| Time, h | TOC, mg/L | TOC removal ratio, % |
|---|---|---|
| 0 | 1,085 | 0 |
| 4 | 707 | 34.8 |
| 8 | 365 | 66.4 |
| 12 | 183 | 83.1 |

[Experiment 3]

The experiment conditions of Experiment 3 are as follows:
 Treatment Object: PW2
 Amount of Treatment Liquid: 600 mL
 Circulation Flow Rate of Treatment Liquid: 400 mL/min
 Treatment Time: 12 hours
 Flow Rate of Oxygen: 5 L/min at 0.2 MPa
 Pulse Width of Applied Pulse: 5 ns
 Voltage of Applied Pulse: 60 kV
 Repetition Frequency of Applied Pulse: 300 pps Main materials contained in the oilfield water PW2 are listed in Table 5.

TABLE 5

Oilfield Water Sample: PW-2

| Classification | Item | Unit | Raw Water | Primary Treated Water |
|---|---|---|---|---|
| Ions | $Cl^-$ | mg/L | 33 | 250 |
|  | $Br^-$ | mg/L | 9 | 4.2 |
|  | $SO_4^{2-}$ | mg/L | 10 | 76 |
| TPH | Total | mg/L | 228.3 | 26 |
| Water-Soluble Organic Material | formic acid | mg/L | <50 | <5 |
|  | propionic acid | mg/L | <100 | 14 |
|  | acetic acid | mg/L | — | 79 |
|  | naphthenic acid | mg/L | <0.1 | <1.0 |
|  | phenols | mg/L | 18 | 14 |
| Volatile Organic Material | benzene | mg/L | 61 | 22 |
|  | toluene | mg/L | 19 | 6.8 |
|  | xylene | mg/L | 4.5 | 1.5 |
|  | ethylbenzene | mg/L | <1 | <0.25 |

Besides, the oilfield water PW-2 contains heavy metals and polycyclic aromatic hydrocarbons. The treatment using the nanosecond pulse discharge plasma was performed on the primarily treated water of the oilfield water PW-2. The $COD_{Mn}$ and TOC of the oilfield water PW-2 were measured.

Figure 7:
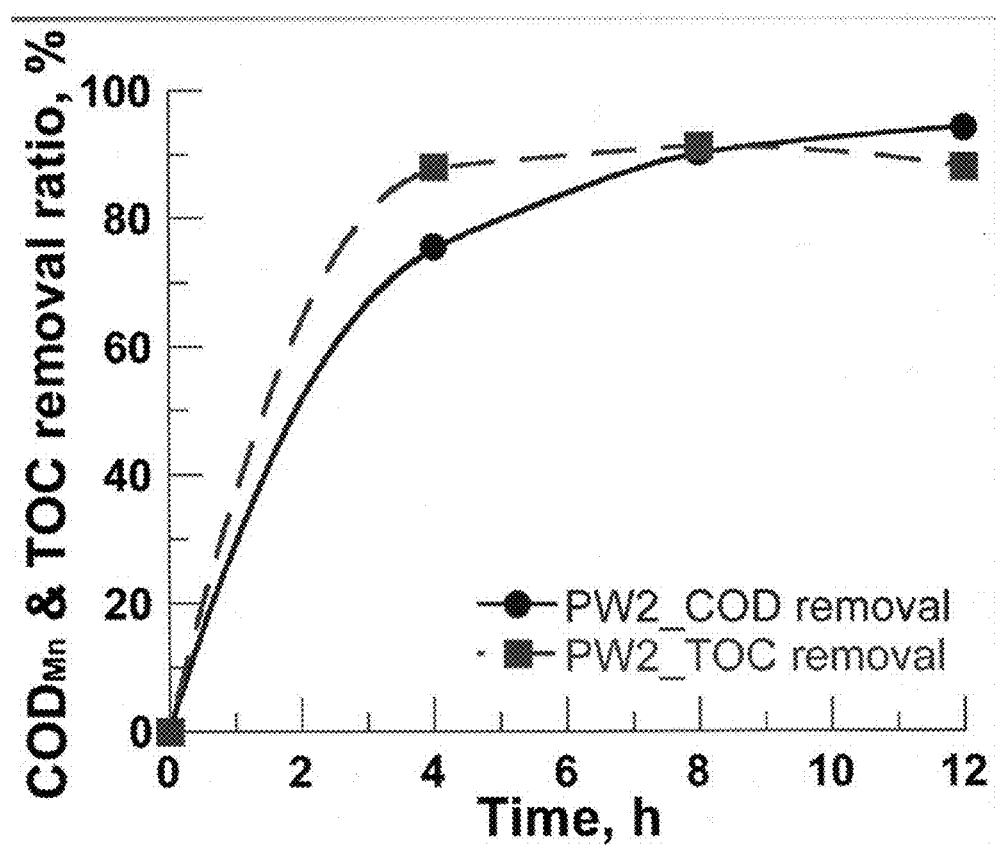
FIG. 7 is diagram showing treatment results (COD removal rate, TOC removal rate) regarding oilfield water PW-2.

The result of measurement is listed in Tables 5 and 6 and FIG. 7. The reduction of the COD and TOC of PW-2 by the nanosecond pulse discharge was demonstrated, and it was observed that the reduction was proportional to time until the reduction ratio reached about 70% and the reduction was saturated after that. In addition, the result using only the showering was that COD: 155→204, TOC: 125→140. It is considered that water evaporation by the showering occurs. In addition, the treatment of phenols by the nanosecond pulse discharge was observed by GC-MS (gas chromatography).

TABLE 6

| Time, h | $COD_{Mn}$, mg/L | $COD_{Mn}$ removal ratio, % |
|---|---|---|
| 0 | 155 | 0 |
| 4 | 38 | 75.5 |
| 8 | 15 | 90.3 |
| 12 | 9 | 94.2 |

TABLE 7

| Time, h | TOC, mg/L | TOC removal ratio, % |
|---|---|---|
| 0 | 92 | 0 |
| 4 | 11 | 88.0 |
| 8 | 8 | 91.3 |
| 12 | 11 | 88.0 |

[Experiment 4]

The experiment conditions of Experiment 4 are as follows:
Treatment Object: PW3
Amount of Treatment Liquid: 600 mL
Circulation Flow Rate of Treatment Liquid: 400 mL/min
Treatment Time: 12 hours
Flow Rate of Oxygen: 5 L/min at 0.2 MPa
Pulse Width of Applied Pulse: 5 ns
Voltage of Applied Pulse: 60 kV
Repetition Frequency of Applied Pulse: 300 pps
Main materials contained in the oilfield water PW3 are listed in Table 8.

TABLE 8

| | | Oilfield Water Sample: PW-3 | | |
|---|---|---|---|---|
| Classification | Item | Unit | Raw Water | Primary Treated Water |
| Ions | Cl$^-$ | mg/L | 15,100 | 14,000 |
| | Br$^-$ | mg/L | <100 | <100 |
| | $SO_4^{2-}$ | mg/L | <100 | <100 |
| TPH | Total | mg/L | 88 | 2.5 |
| Water-Soluble Organic Material | formic acid | mg/L | <50 | <50 |
| | propionic acid | mg/L | <100 | <100 |
| | naphthenic acid | mg/L | 110 | 91 |
| | phenols | mg/L | 0.7 | 0.33 |
| Volatile Organic Material | acetone | mg/L | <0.5 | 0.51 |
| | benzene | mg/L | 1.1 | 0.34 |
| | toluene | mg/L | 2 | 0.55 |
| | total xylene | mg/L | 1.5 | 0.45 |
| | ethylbenzene | mg/L | 0.26 | 0.048 |

Figure 8:
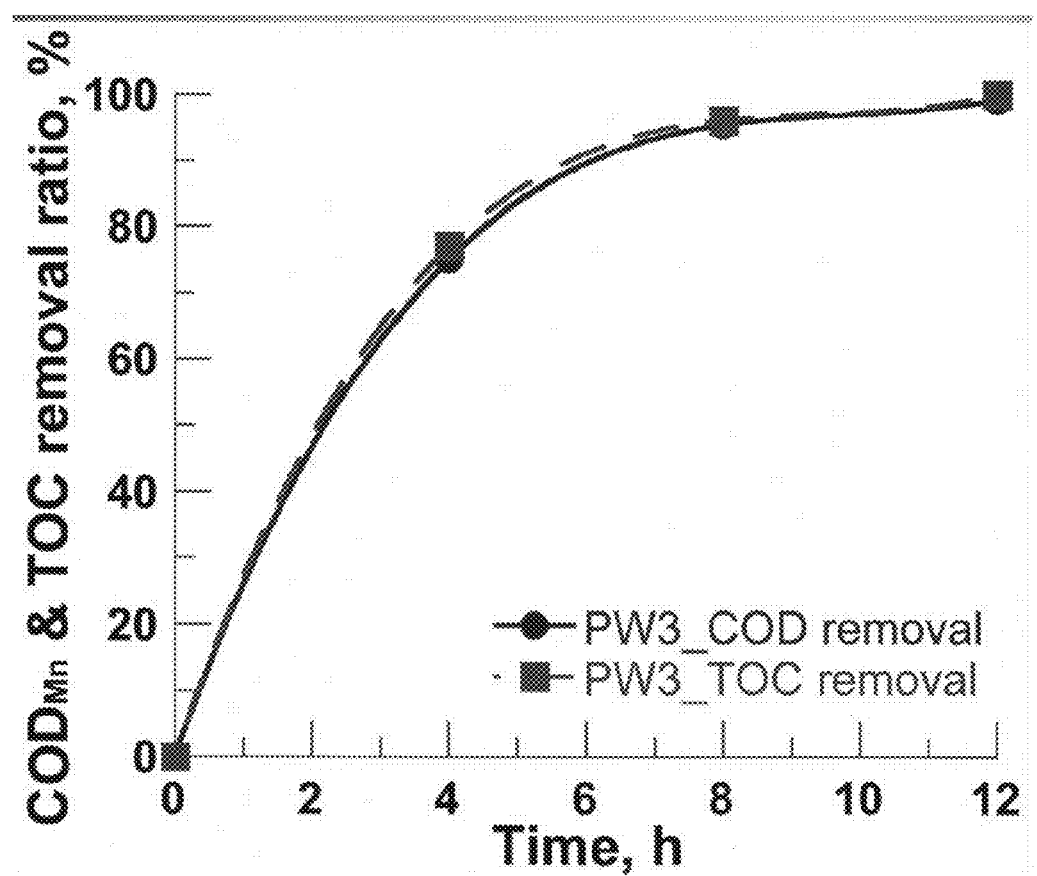
FIG. 8 is diagram showing treatment results (COD removal rate, TOC removal rate) regarding oilfield water PW-3.

Besides, the oilfield water PW-3 contains heavy metals and polycyclic aromatic hydrocarbons. The treatment using the nanosecond pulse discharge plasma was performed on the primarily treated water of the oilfield water PW-3. The $COD_{Mn}$ and TOC of the oilfield water PW-3 were measured. The result of measurement is listed in Tables 9 and 10 and FIG. 8. The reduction of the COD and TOC of PW-3 by the nanosecond pulse discharge was demonstrated, and it was observed that the reduction was proportional to time until the reduction ratio reached about 70% and the reduction was saturated after that. In addition, the result using only the showering was that COD: 260→335 and TOC: 160→171. It is considered that water evaporation by the showering occurs. In addition, the generation of chlorides by the nanosecond pulse discharge was observed by GC-MS (gas chromatography).

TABLE 9

| Time, h | $COD_{Mn}$, mg/L | $COD_{Mn}$ removal ratio, % |
|---|---|---|
| 0 | 260 | 0 |
| 4 | 65 | 75.0 |
| 8 | 12 | 95.4 |
| 12 | 2 | 99.2 |

TABLE 10

| Time, h | TOC, mg/L | TOC removal ratio, % |
|---|---|---|
| 0 | 152 | 0 |
| 4 | 35 | 77.0 |
| 8 | 6 | 96.1 |
| 12 | 0 | 100.0 |

The experimental results are summarized as follows:

It was observed that, with respect to PW-1, 2, and 3, moisture was vaporized by showering, and as a result, the COD and TOC were increased.

It was observed that, with respect to the oilfield water PW-1, 2, and 3, the organic substances were decomposed by the nanosecond pulse discharge, and as a result, the COD and TOC were reduced.

It was observed that, a higher reduction ration was obtained with the oilfield water having lower initial COD and TOC.

It was observed that the decomposition of the organic substances proceeded in proportion to time until the reduction ratio reached about 70%.

It was observed that, with respect to the oilfield water PW-1 and 2, the decomposition of phenols proceeded.

With respect to the oilfield water PW-3, the generation of chlorides together with the decomposition of the organic substance was observed.

[E] Other Embodiments of Discharge Treatment Unit

For the treatment with a good efficiency, it is preferable to form more uniform discharge in the discharge space by considering the attenuation of the discharge energy in the propagation direction of the pulse. FIGS. 9 to 17 illustrate other embodiments of the outer electrode 1 and the center electrode 2 in the inner side of the outer electrode 1 constituting the discharge treatment apparatus. Similarly to FIG. 1, the outer electrode 1 and the center electrode 2 of the discharge treatment unit of FIGS. 9 to 17 extend in the height direction, and the water to be treated is introduced from the upper side into the treatment space between the outer electrode 1 and the center electrode 2. In FIGS. 9 to 17, only the configurations of the outer electrode 1 and the center electrode 2 are illustrated, but other elements are omitted. With respect to the structure for treatment of the water to be treated, FIG. 1 and the description associated with FIG. 1 may be referred to. In FIGS. 9 to 17, the support structures or the like of the outer electrode 1 and the center electrode 2 are omitted. However, the support structures of the outer electrode 1 and the center electrode 2 are matters appropriately made by the ordinarily skilled in the related art.

In FIGS. 9(A) to 13(B), the left-side (A) diagrams illustrate embodiments where the lower end side of the center electrode 2 becomes the pulse input side and the pulse progresses or propagates from the lower end toward the upper end of the center electrode 2. The right-side (B) diagrams illustrate embodiments where the upper end side of the center electrode 2 becomes the pulse input side and the pulse progresses or propagates from the upper end toward the lower end of the center electrode 2. FIGS. 14 to 17 illustrate embodiments where the lower end side of the center electrode 2 becomes the pulse input side and pulse progresses or propagates from the lower end toward the upper end of the center electrode 2. FIGS. 9 to 17 are schematic diagrams illustrating the shapes of the outer electrode 1 and the center electrode 2 and the propagation direction of the pulse, and in each diagram, the position of the "pulse power source" does not indicate the positional relationship between the discharge treatment unit and the pulse power source (a pulse generator). In the ordinarily skilled in the related art, the pulse generator is arranged at an appropriate position, and the pulse generator is appropriately electrically connected to the discharge treatment unit so that the pulse generated by the pulse generator is applied to the discharge treatment unit.

Figure 9A:
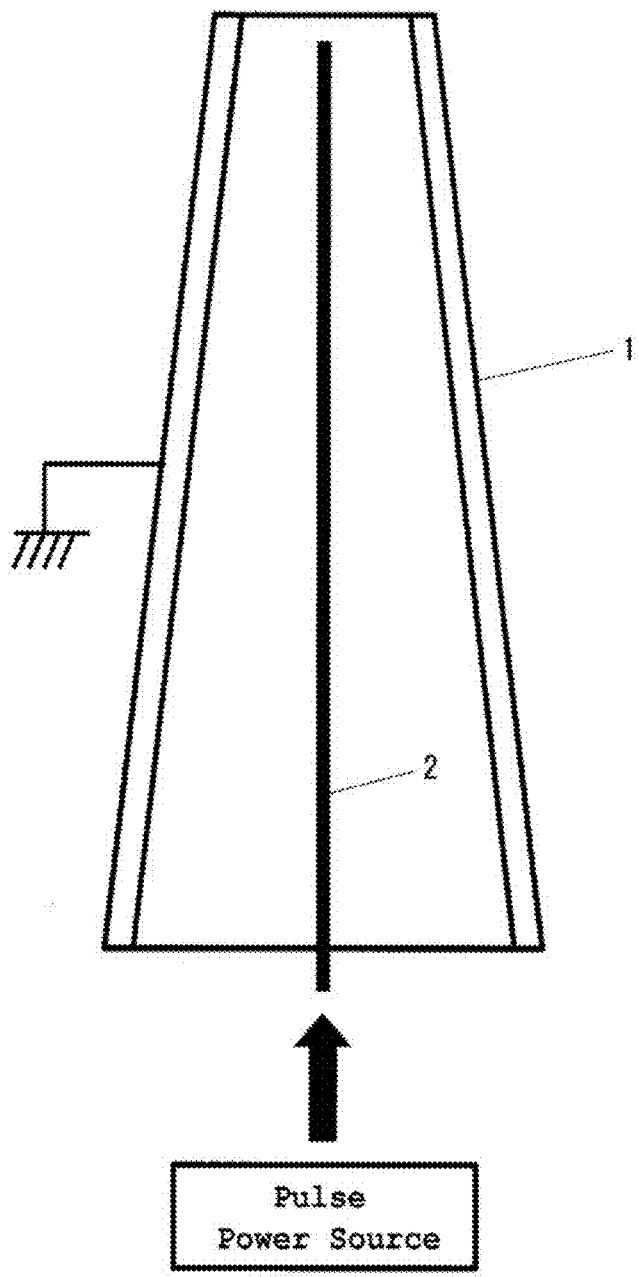
FIGS. 9A, 9B show other embodiments of an electrode pair (an outer electrode+a center electrode) for a discharge treatment device.
Figure 9B:
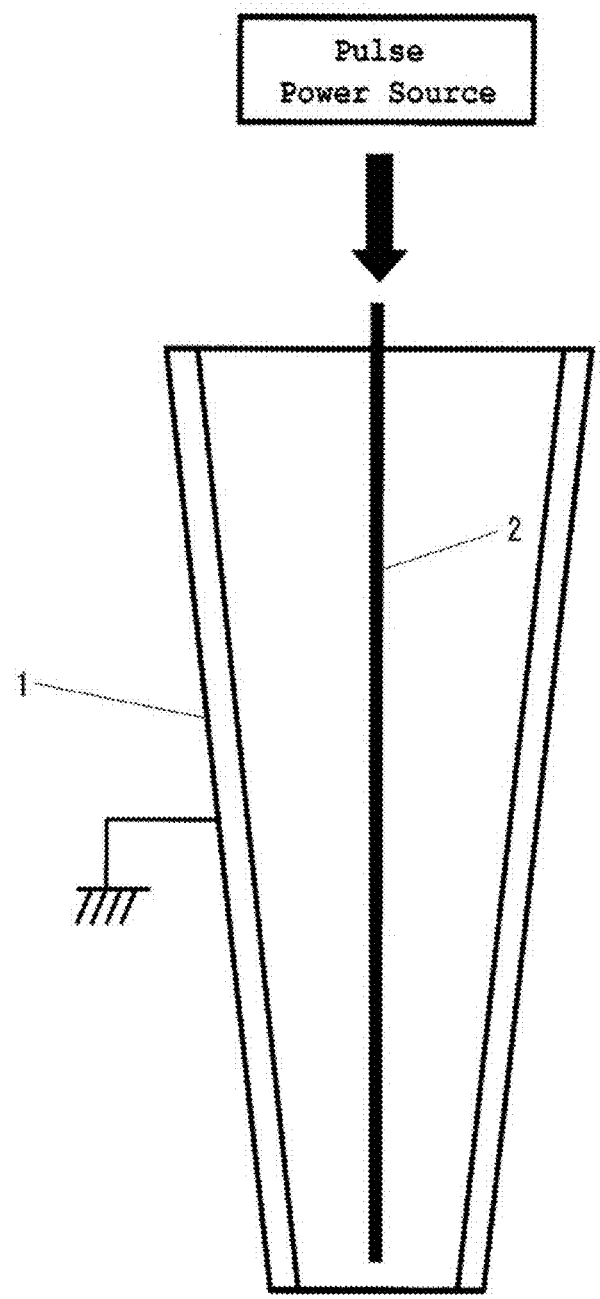

In the embodiments illustrated in FIGS. 9(A) and 9(B), attention is paid to the fact that the energy is attenuated as the discharge generated between the electrode pair propagates in the longitudinal direction of the electrodes, and the distance between the inner circumferential surface of the outer electrode 1 and the center electrode 2 is gradually decreased over the propagation direction of the pulse. Herein, in the specification, the distance between the inner circumferential surface of the outer electrode 1 and the center electrode 2 is a distance in the direction perpendicular to the longitudinal direction (propagation direction of the pulse) of the center electrode 2 and, in the illustrated embodiment, the distance is a horizontal distance between the inner circumferential surface of the outer electrode 1 and the center electrode 2. In the embodiment, the water to be treated is sprayed in the outer electrode 1 from the inlet (not shown) provided in the upper side of the figure, falls through the space between the upper side of the outer electrode 1 and the center electrode 2, and is collected in a water receiving tank (not shown) provided in the lower side of the figure.

In FIG. 9(A), the discharge treatment unit has a generally circular truncated cone shape as a whole. More specifically, the outer electrode 1 has a cylindrical shape as a whole, and the diameter thereof is gradually decreased from the lower end toward the upper end, and the outer circumferential surface and the inner circumferential surface have a tapered shape or a slanted shape. The center electrode 2 is a wire or rod which is located at the center of the cylindrical outer electrode 1 and extends vertically. The distance between the inner circumferential surface of the outer electrode 1 and the center electrode 2 is gradually decreased from the lower end toward the upper end (namely, in the pulse propagation direction). In the embodiment, since the inner diameter of the outer electrode 1 is increased downward, the water to be treated sprayed into the outer electrode is hard to adhere to the outer electrode 1 while falling down, so that high treatment efficiency can be obtained.

In FIG. 9(B), the discharge treatment unit has a generally inverted circular truncated cone shape as a whole. More specifically, the outer electrode 1 has a cylindrical shape as a whole, and the diameter thereof is gradually increased from the lower end toward the upper end, and the outer circumferential surface and the inner circumferential surface have a tapered shape or a slanted shape. The center electrode 2 is a wire or rod which is located at the center of the cylindrical outer electrode 1 and extends vertically. The distance between the inner circumferential surface of the outer electrode 1 and the center electrode 2 is gradually decreased from the upper end toward the lower end (namely, in the pulse propagation direction). In the embodiment, the center electrode 2 can be suspended from the upper side, and the water receiving tank and the holding mechanism for the center electrode are independently provided, so that the equipment can be easily designed.

Figure 10A:
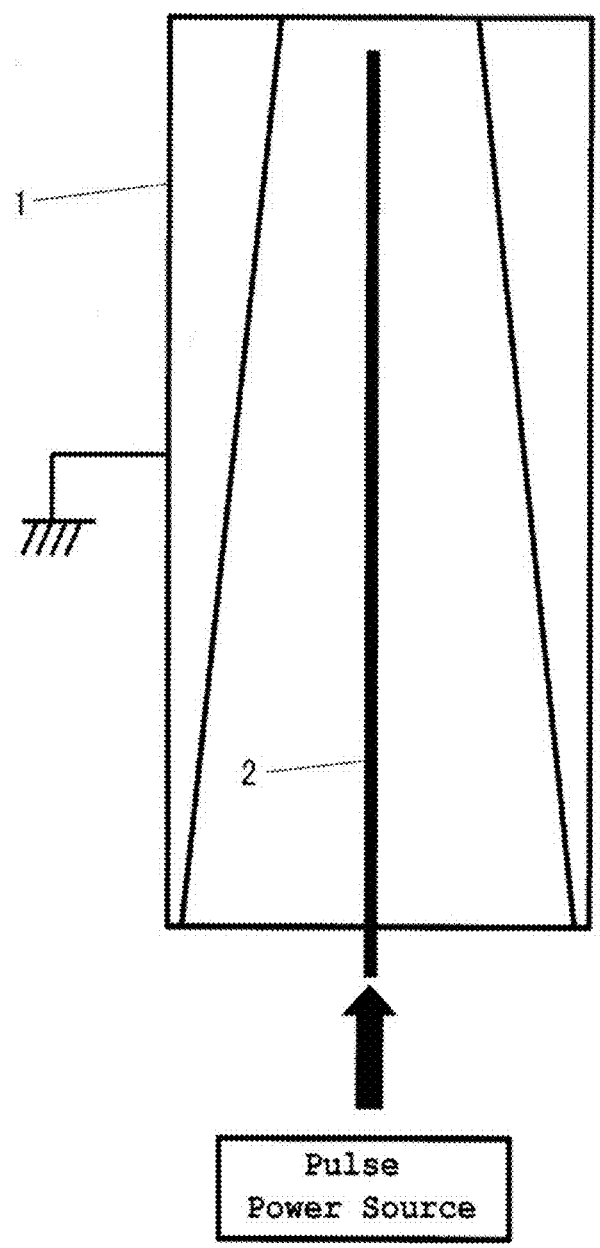
FIGS. 10A, 10B show other embodiments of an electrode pair (an outer electrode+a center electrode) for a discharge treatment device.
Figure 10B:
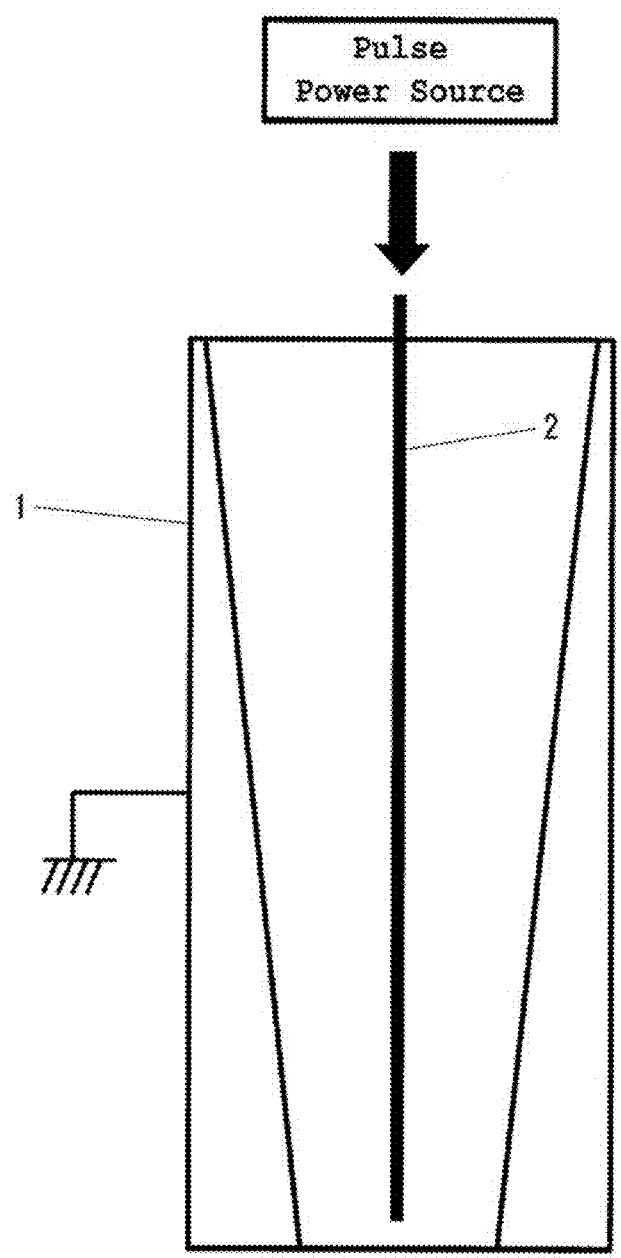

The embodiments illustrated in FIGS. 10(A) and 10(B) are modification of the embodiments illustrated in FIGS. 9(A) and 9(B). In the embodiments illustrated in FIGS. 10(A) and 10(B), attention is paid to the fact that the energy is attenuated as the discharge generated between the electrode pair propagates in the longitudinal direction of the electrodes, and the distance between the inner circumferential surface of the outer electrode 1 and the center electrode 2 is gradually decreased over the propagation direction of the pulse.

In FIG. 10(A), the outer circumferential surface of the outer electrode 1 is a cylindrical surface having the same diameter in the height direction, and the diameter of the inner circumferential surface thereof is gradually decreased from the lower end toward the upper end, so that the inner circumferential surface has a tapered shape or a slanted shape. The center electrode 2 is a wire or rod which is located at the center of the cylindrical outer electrode 1 and extends vertically. The distance between the inner circumferential surface of the outer electrode 1 and the center electrode 2 is gradually decreased from the lower end toward the upper end (namely, in the pulse propagation direction).

In FIG. 10(B), the outer circumferential surface of the outer electrode 1 is a cylindrical surface having the same diameter in the height direction, and the diameter of the inner circumferential surface thereof is gradually increased from the lower end toward the upper end, so that the inner circumferential surface has a tapered shape or a slanted shape. The center electrode 2 is a wire or rod which is located at the center of the cylindrical outer electrode 1 and extends vertically. The distance between the inner circumferential surface of the outer electrode 1 and the center electrode 2 is gradually decreased from the upper end toward the lower end (namely, in the pulse propagation direction).

Figure 11A:
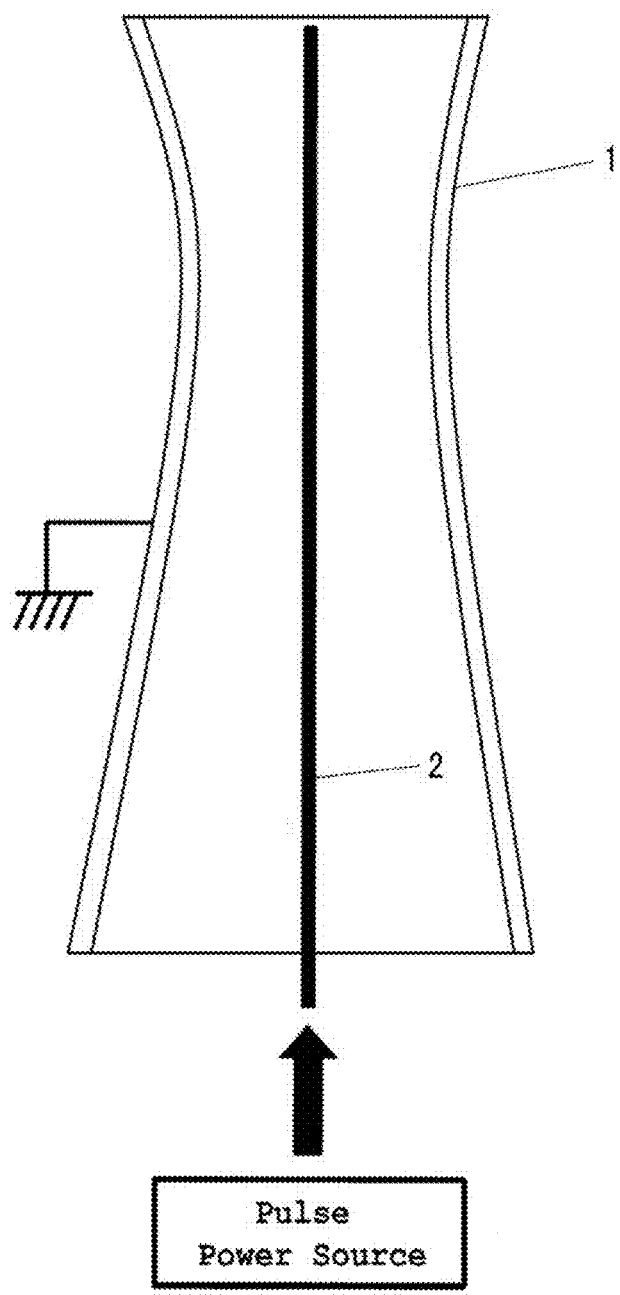
FIGS. 11A, 11B show other embodiments of an electrode pair (an outer electrode+a center electrode) for a discharge treatment device.
Figure 11B:
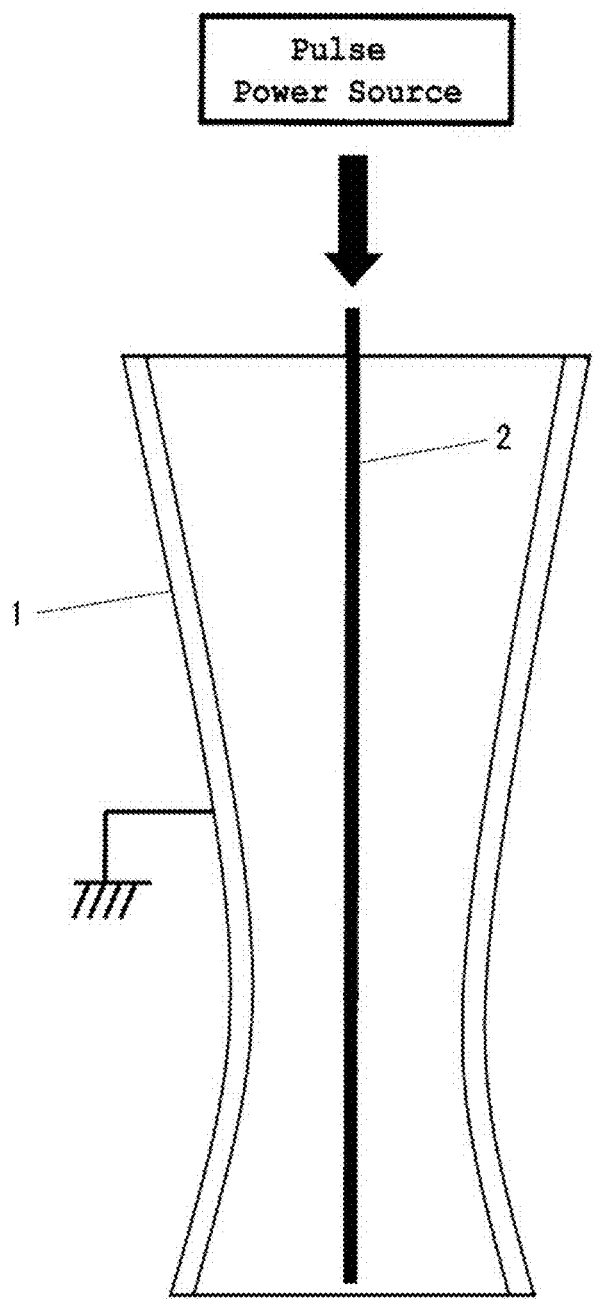

In the embodiment illustrated in FIGS. 11(A) and 11(B), attention is paid to the fact that the energy is attenuated as the discharge generated between the electrode pair propagates in the longitudinal direction of the electrodes and the energy is increased as the pulse voltage is inverted and superposed (voltage-reflected) at the open end of the electrode. The distance between the inner circumferential surface of the outer electrode 1 and the center electrode 2 is gradually decreased over the pulse propagation direction, and the distance is gradually increased from a portion exceeding the middle position in the longitudinal direction toward the end.

In FIG. 11(A), the outer electrode 1 has a shape where the diameter of the outer electrode 1 in the upper end side illustrated in FIG. 9(A) is increased. More specifically, the outer electrode 1 has a cylindrical shape as a whole, and the diameter thereof is gradually decreased from the lower end toward the upper end up to a position of the upper side of the middle portion in the height direction. The diameter is gradually increased from the position toward the upper end. The center electrode 2 is a wire or rod which is located at the center of the cylindrical outer electrode 1 and extends vertically. The distance between the inner circumferential surface of the outer electrode 1 and the center electrode 2 is gradually decreased from the lower end toward the upper end (namely, in the pulse propagation direction) up to a position of the upper side of the middle portion in the height direction, and the distance is gradually increased from the position toward the upper end. In the illustration, the diameter of the outer electrode 1 in the lower end side is larger than the diameter thereof in the upper end side, but not necessarily limited thereto, for example, the diameter thereof in the lower end side and the diameter thereof in the upper end side may be substantially the same as each other.

In FIG. 11(B), the outer electrode 1 has a shape where the diameter of the outer electrode 1 in the lower end side illustrated in FIG. 9(B) is increased. More specifically, the outer electrode 1 has a cylindrical shape as a whole, and the diameter thereof is gradually decreased from the upper end toward the lower end down to a position of the lower side of the middle portion in the height direction. The diameter is gradually increased from the position toward the lower end. The center electrode 2 is a wire or rod which is located at the center of the cylindrical outer electrode 1 and extends vertically. The distance between the inner circumferential surface of the outer electrode 1 and the center electrode 2 is gradually decreased from the upper end toward the lower end (namely, in the pulse propagation direction) down to a position of the lower side of the middle portion in the height direction, and the distance is gradually increased from the position toward the lower end. In the illustration, the diameter of the outer electrode 1 in the upper end side is larger than the diameter thereof in the lower end side, but not necessarily limited thereto, for example, the diameter thereof in the upper end side and the diameter thereof in the lower end side may be substantially the same as each other.

Figure 12A:
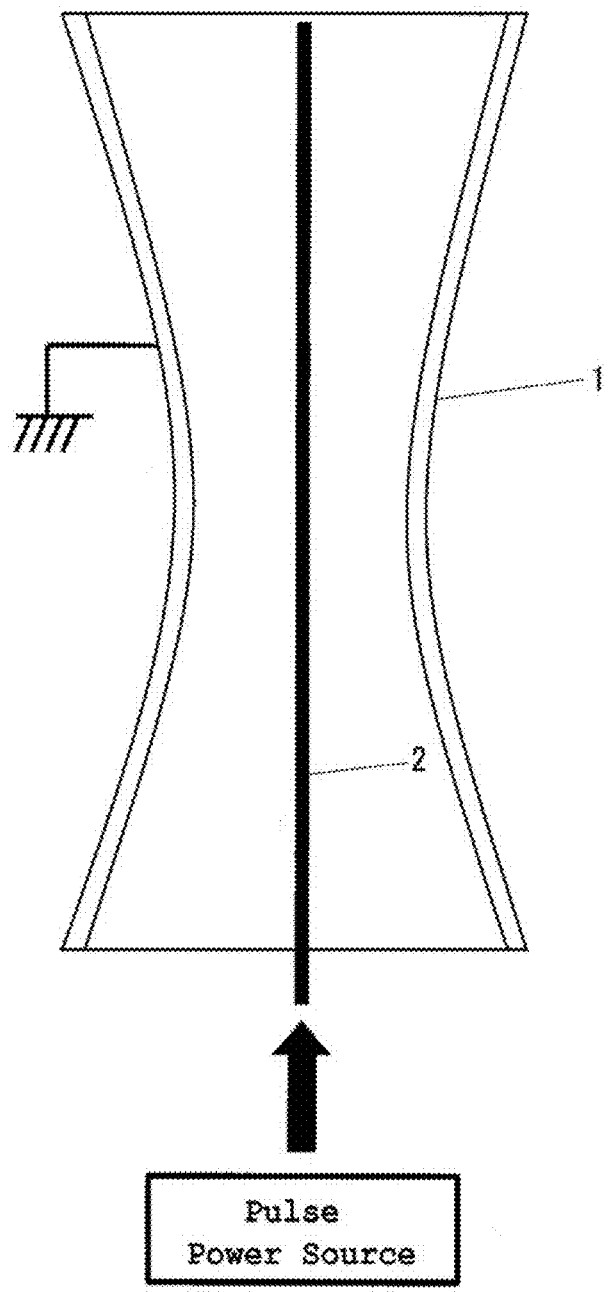
FIGS. 12A, 12B show other embodiments of an electrode pair (an outer electrode+a center electrode) for a discharge treatment device.
Figure 12B:
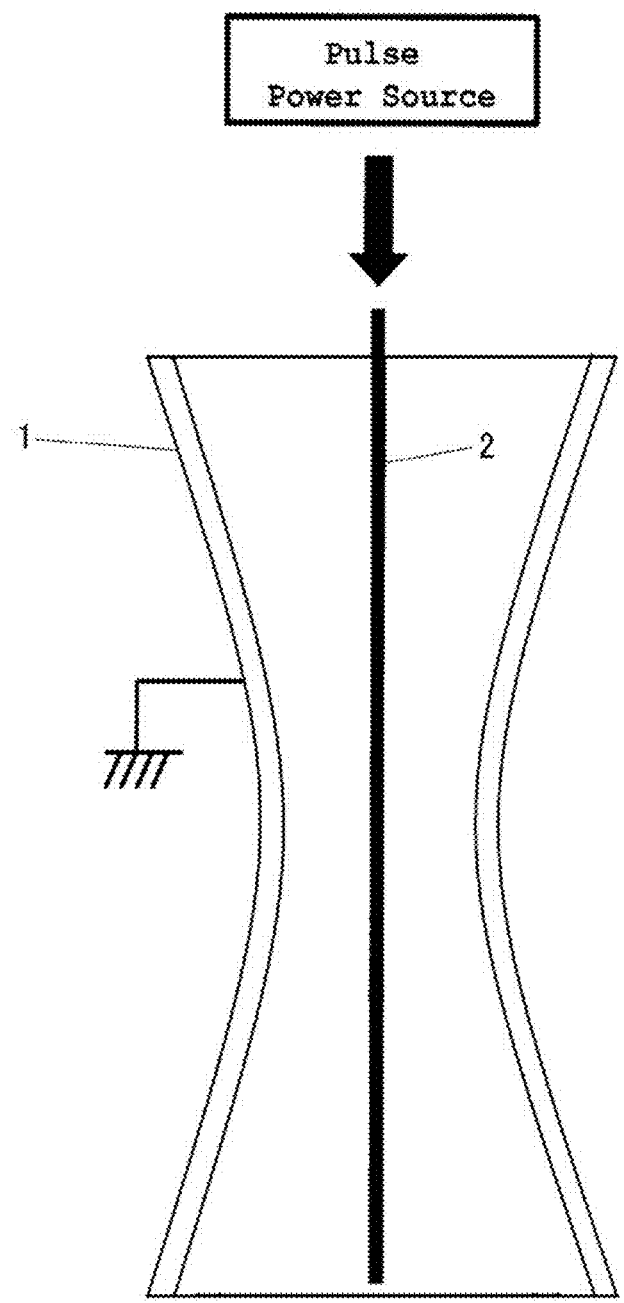

In the outer electrode 1 illustrated in FIGS. 11(A) and 11(B), in the pulse propagation direction, the portion exceeding the middle position of the outer electrode 1 in the longitudinal direction has the smallest diameter. However, for example, as illustrated in FIGS. 12(A) and 12(B), the diameter of the outer electrode 1 at the middle position in the longitudinal direction may be minimized, and the diameter may be gradually increased from the central portion in the height direction upward and downward. In the illustration, the diameter of the outer electrode 1 in the lower end side and the diameter thereof in the upper end side are substantially the same as each other. However, the present invention is not necessarily limited thereto.

Figure 13A:
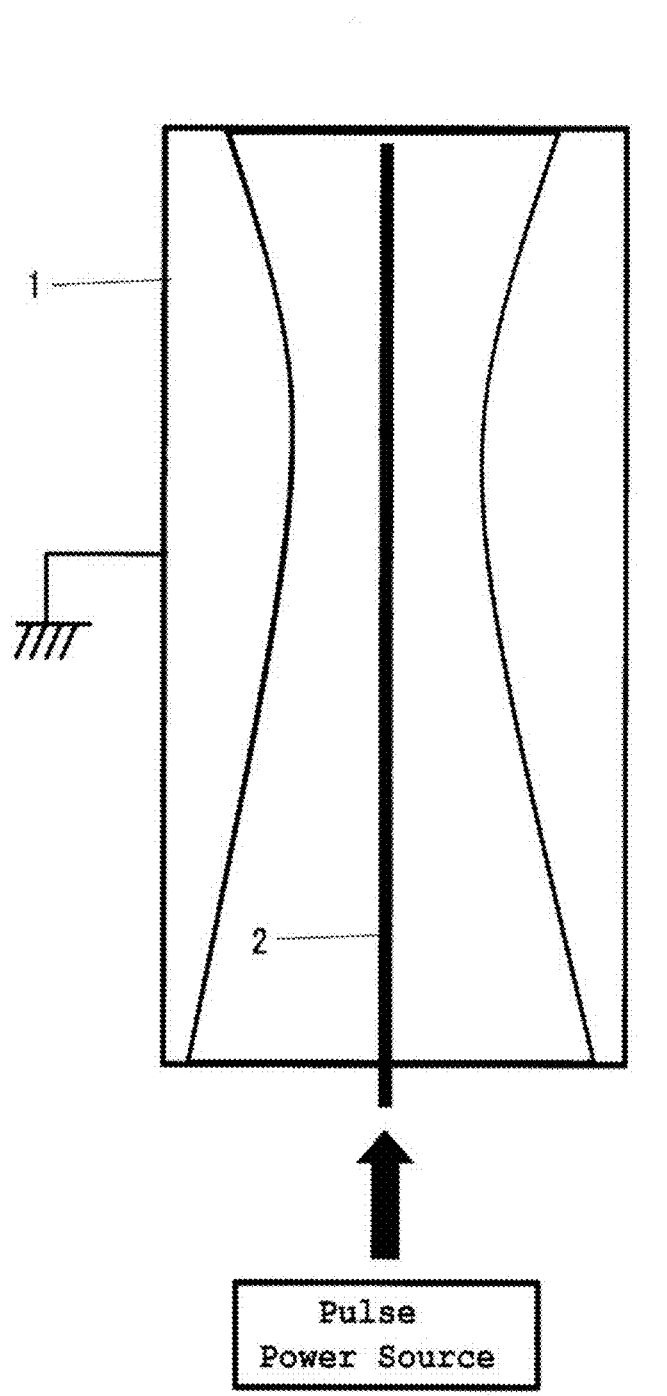
FIGS. 13A, 13B show other embodiments of an electrode pair (an outer electrode+a center electrode) for a discharge treatment device.
Figure 13B:
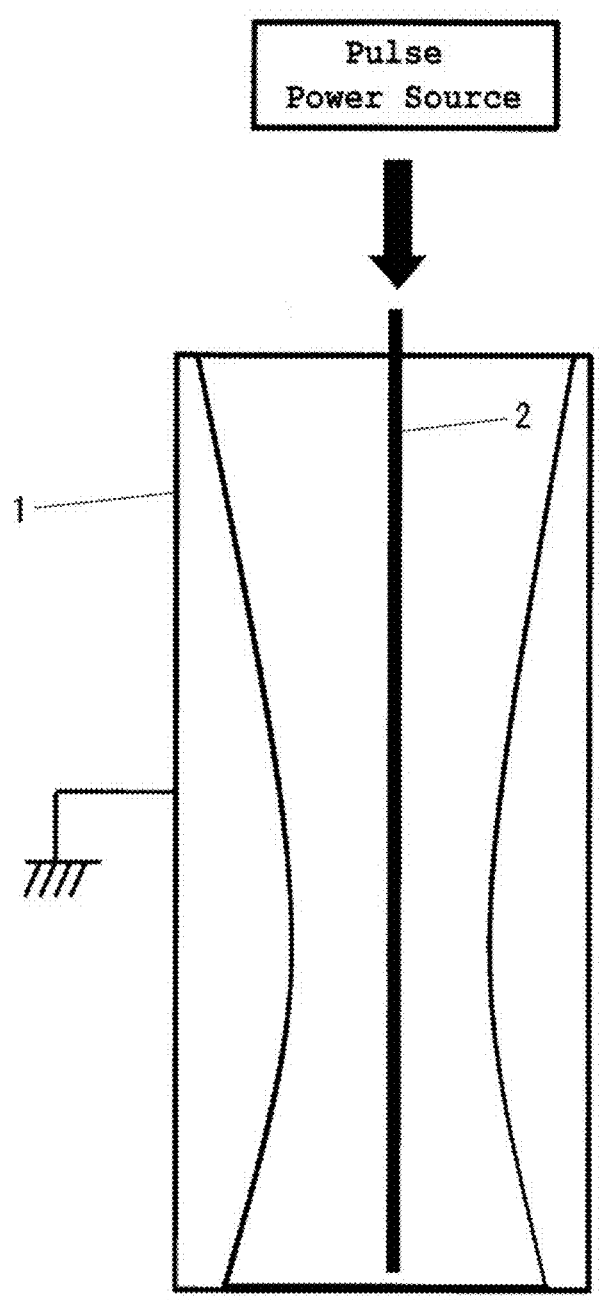

The embodiments illustrated in FIGS. 13(A) and 13(B) are modification of the embodiments illustrated in FIGS. 11(A) and 11(B) and are different from the embodiments of FIGS. 11(A) and 11(B) in that the outer circumferential surface of the outer electrode 1 is a cylindrical surface having the same diameter in the height direction. In the embodiments illustrated in FIGS. 13(A) and 13(B), attention is paid to the fact that the energy is attenuated as the discharge generated between the electrode pair propagates in the longitudinal direction of the electrodes and the energy is increased as the pulse voltage is inverted and superposed (voltage-reflected) at the open end of the electrode. The distance between the inner circumferential surface of the outer electrode 1 and the center electrode 2 is gradually decreased over the pulse propagation direction, and the distance is gradually increased from a portion exceeding the middle position in the longitudinal direction toward the end. In the outer electrode 1 illustrated in FIGS. 13(A) and 13(B), in the pulse propagation direction, the portion exceeding the middle position of the outer electrode in the longitudinal direction has the smallest diameter. However, the portion of the outer electrode having the smallest diameter is not limited to the illustrated embodiment, and for example, the diameter of the outer electrode at the middle position in the longitudinal direction may be minimized, and the diameter may be gradually increased from the central portion in the height direction upward and downward (refer to FIGS. 12(A) and 12(B)).

In FIG. 13(A), the outer circumferential surface of the outer electrode 1 is a cylindrical surface having the same diameter in the height direction, and the diameter of the inner circumferential surface thereof is gradually decreased from the lower end toward the upper end up to a position of the upper side of the middle portion in the height direction. The diameter is gradually increased from the position toward the upper end. The center electrode 2 is a wire or rod which is located at the center of the cylindrical outer electrode 1 and extends vertically. The distance between the inner circumferential surface of the outer electrode 1 and the center electrode 2 is gradually decreased from the lower end toward the upper end (namely, in the pulse propagation direction) up to a position of the upper side of the middle portion in the height direction, and the distance is gradually increased from the position toward the upper end.

In FIG. 13(B), the outer circumferential surface of the outer electrode 1 is a cylindrical surface having the same diameter in the height direction, and the diameter of the inner circumferential surface thereof is gradually decreased from the upper end toward the lower end down to a position of the lower side of the middle portion in the height direction. The diameter is gradually increased from the position toward the lower end. The center electrode 2 is a wire or rod which is located at the center of the cylindrical outer electrode 1 and extends vertically. The distance between the inner circumferential surface of the outer electrode 1 and the center electrode 2 is gradually decreased from the upper end toward the lower end (namely, in the pulse propagation direction) down to a position of the lower side of the middle portion in the height direction, and the distance is gradually increased from the position toward the lower end.

Figure 14:
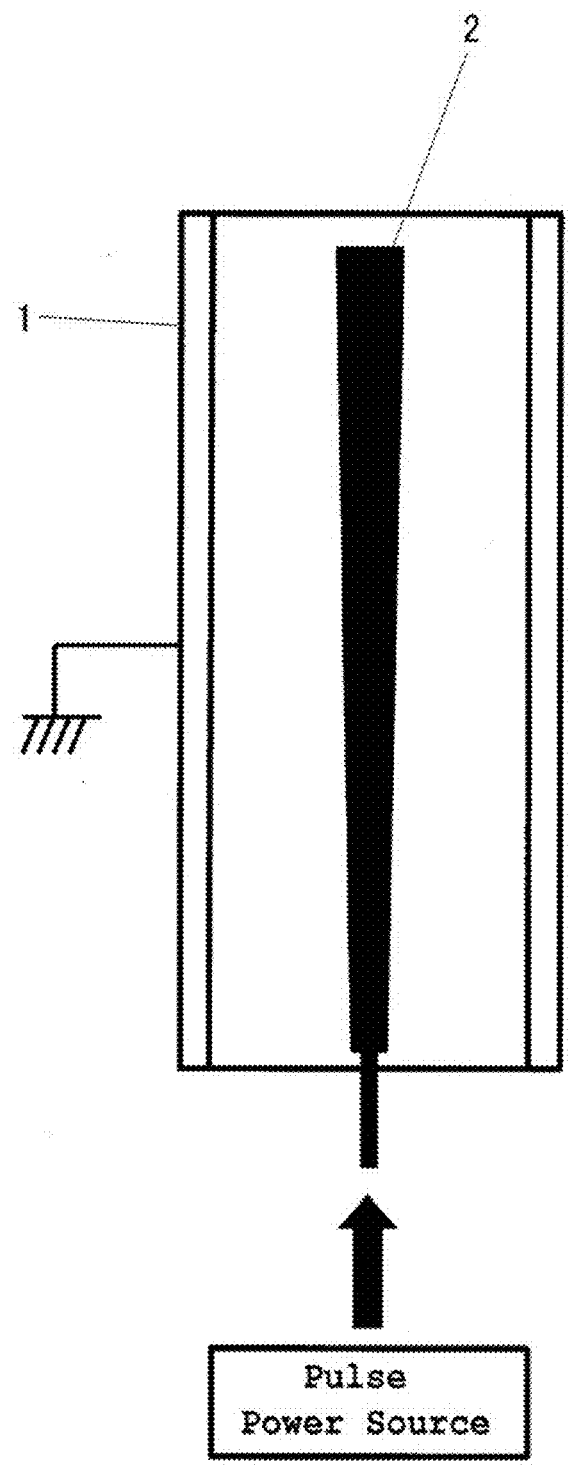
FIG. 14 shows another embodiment of an electrode pair (an outer electrode+a center electrode) for a discharge treatment device.

In the embodiment illustrated in FIG. 14, attention is paid to the fact that the energy is attenuated as the discharge propagates in the longitudinal direction of the electrodes, and the distance between the inner circumferential surface of the outer electrode 1 and the center electrode 2 is gradually decreased over the pulse propagation direction. In contrast to FIGS. 9(A) and 9(B) and FIGS. 10(A) and 10(B) where the inner circumferential surface of the outer electrode 1 is tapered in the longitudinal direction, in FIG. 14, the outer circumferential surface of the center electrode 2 is tapered in the longitudinal direction.

In FIG. 14, the outer electrode 1 is a cylinder having the same diameter in the height direction, and the center electrode 2 is a rod-shaped member or a rod of which diameter is gradually increased from the lower end toward the upper end. The distance between the inner circumferential surface of the outer electrode 1 and the center electrode 2 is gradually decreased from the lower end toward the upper end (namely, in the pulse propagation direction).

Figure 15:
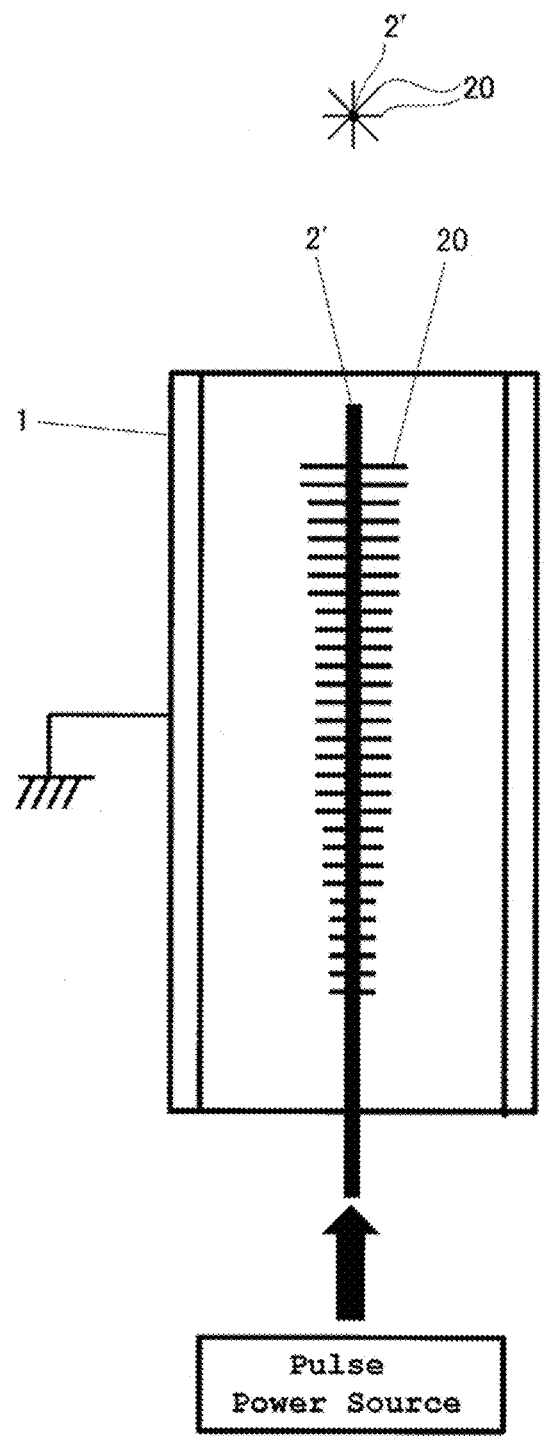
FIG. 15 shows another embodiment of an electrode pair (an outer electrode+a center electrode) for a discharge treatment device.

In the embodiment illustrated in FIG. 15, attention is paid to the fact that the energy is attenuated as the discharge propagates in the longitudinal direction of the electrodes, and the distance between the inner circumferential surface of the outer electrode 1 and the center electrode is gradually decreased over the pulse propagation direction. The center electrode is configured with an axial portion 2' formed with a wire or rod extending in the height direction and a plurality of needle-shaped portions 20 protruding from the axial portion 2' in the direction perpendicular to the longitudinal direction of the axial portion 2'. The needle-shaped portions 20 are provided at an interval over the longitudinal direction of the axial portion 2' and extend radially from the axial portion 2' as a center thereof. In the embodiment of FIG. 14, the distance between the inner circumferential surface of the outer electrode 1 and the center electrode is a distance between the inner circumferential surface of the outer electrode 1 and the tip of the needle-shaped portion 20. In addition, instead of the needle-shaped portions, a plurality of blades or plates (circular plates, square plates, rhombic plates, or the like) extending in the direction perpendicular to the longitudinal direction of the axial portion 2' may be used.

In FIG. 15, the outer electrode 1 is a cylinder having the same diameter in the height direction, and the protrusion size of the needle-shaped portion formed to protrude in the center electrode 2 over the height direction is gradually increased from the lower end toward the upper end. The distance between the inner circumferential surface of the outer electrode 1 and the tip of the needle-shaped portion of the center electrode 2 is gradually decreased from the lower end toward the upper end (namely, in the pulse propagation direction).

Figure 16:
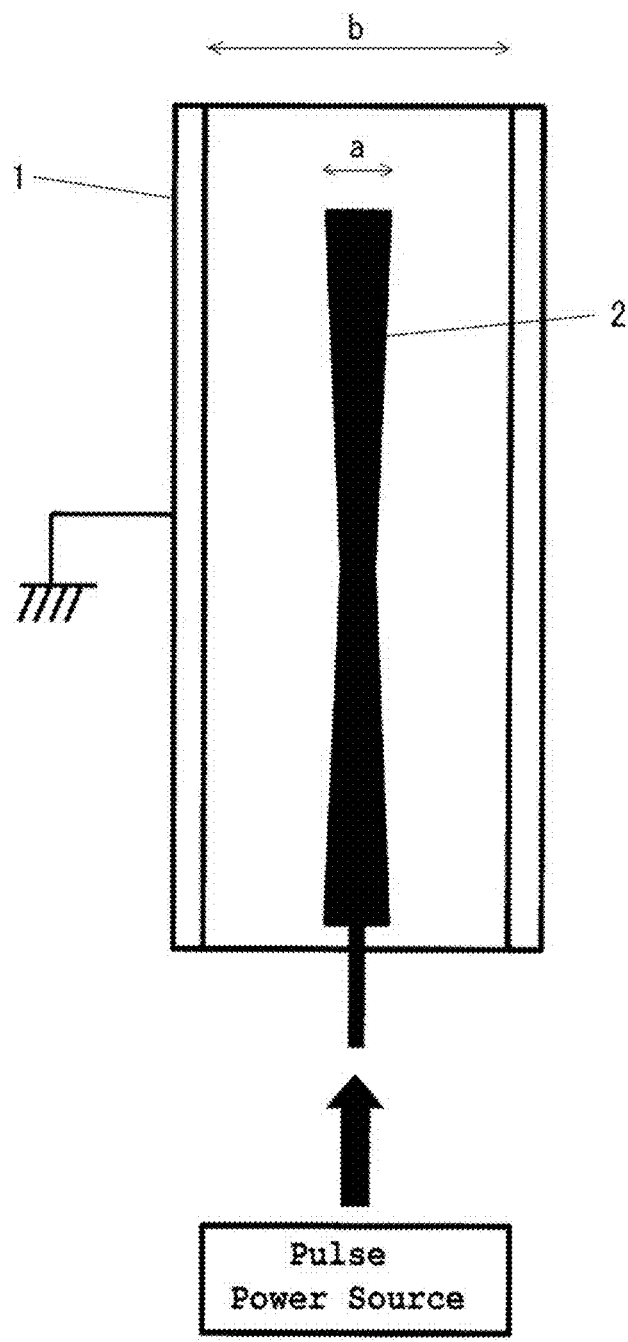
FIG. 16 shows another embodiment of an electrode pair (an outer electrode+a center electrode) for a discharge treatment device.

In the embodiment illustrated in FIG. 16, attention is paid to the fact that the electric field generated in the discharge space between the outer electrode 1 and the inner center electrode 2 is influenced by the ratio b/a (actually, ln(b/a)) of the diameter "b" of the outer electrode to the diameter "a" of the center electrode, and the higher the ratio b/a is, the larger the electric field is generated at the same voltage. The center electrode 2 is recessed in the middle portion in the longitudinal direction while the outer electrode 1 has a constant diameter in the longitudinal direction, so that the electric field at the recessed portion is strengthened.

In FIG. 16, the outer electrode 1 is a cylinder having the same diameter in the height direction, and the center electrode 2 is a rod-shaped member or rod of which diameter is gradually decreased from the lower end toward the middle portion in the height direction and gradually further increased toward the upper end. The ratio b/a of the diameter "b" of the outer electrode 1 to the diameter "a" of the center electrode 2 is configured so that the ratio in the middle portion of the discharge space in the height direction is higher than the ratios in the upper and lower end areas of the discharge space.

Figure 17:
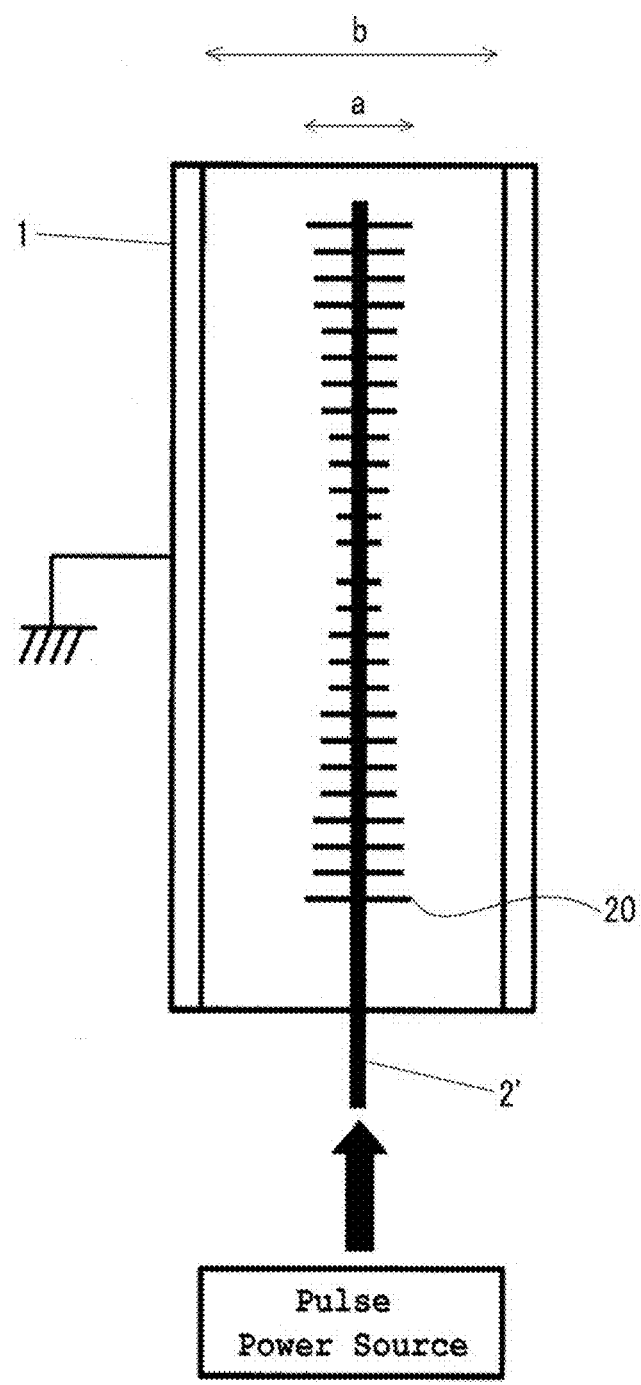
FIG. 17 shows another embodiment of an electrode pair (an outer electrode+a center electrode) for a discharge treatment device.

In the embodiment illustrated in FIG. 17, similarly to FIG. 16, attention is paid to the fact that the electric field generated between the outer electrode 1 and the inner center electrode 2 is influenced by the ratio b/a (actually, ln(b/a)) of the diameter "b" of the outer electrode to the diameter "a" of the center electrode, and the higher the ratio b/a is, the larger the electric field is generated at the same voltage. The center electrode 2 is recessed in the central portion in the longitudinal direction, so that the electric field at the recessed portion is strengthened. The center electrode is configured with an axial portion 2' formed with a wire or rod extending in the height direction and a plurality of needle-shaped portions 20 protruding from the axial portion 2' in the direction perpendicular to the longitudinal direction of the axial portion 2'. The needle-shaped portions 20 are provided at an interval over the longitudinal direction of the axial portion 2' and extend radially from the axial portion 2' as a center thereof. In the embodiment of FIG. 17, the diameter of the center electrode is a diameter of a virtual circle having the axial portion 2' as a center thereof and passing through the tips of the needle-shaped portions 20. In addition, instead of the needle-shaped portions, a plurality of blades or plates (circular plates, square plates, rhombic plates, or the like) extending in the direction perpendicular to the longitudinal direction of the axial portion 2' may be used.

In FIG. 17, the outer electrode 1 is a cylinder having the same diameter in the height direction, and the protrusion size of the needle-shaped portion formed to protrude in the center electrode 2 over the height direction is gradually decreased from the lower end toward the middle portion in the height direction and gradually further increased toward the upper end. The ratio b/a of the diameter "b" of the outer electrode 1 to the diameter "a" of the center electrode 2 is configured so that the ratio in the middle portion of the discharge space in the height direction is higher than the ratios in the upper and lower end areas of the discharge space.

The technical ideas relating to the embodiments of FIGS. 9(A) and 9(B), 10(A) and 10(B), 14, and 15 can be described as follows:

In an electrode pair including an outer electrode configured with a cylindrical electrode and a center electrode extending in a longitudinal direction of the cylindrical electrode in an inner space of the cylindrical electrode, the center electrode has a first end and a second end, a pulse input to the first end side propagates toward the second end, and the distance between the inner circumferential surface of the cylindrical electrode and the center electrode is gradually decreased from the first end side in the pulse propagation direction.

In one embodiment, the center electrode is a line-shaped or rod-shaped member made of a wire or a rod, and the inner circumferential surface of the cylindrical electrode has a tapered shape or a slanted shape so as to be gradually close to the center electrode in the pulse propagation direction (FIGS. 9(A) and 9(B) and FIGS. 10(A) and 10(B)). In the embodiments of FIGS. 9(A) and 9(B), similarly to the inner circumferential surface, the outer circumferential surface of the cylindrical electrode also has a tapered shape or a slanted shape, and in the embodiments of FIGS. 10(A) and 10(B), the outer circumferential surface of the cylindrical electrode has the same diameter in the longitudinal direction.

In other words, in the embodiments illustrated in FIGS. 9(A) and 9(B) and FIGS. 10(A) and 10(B), the diameter of the discharge space formed between the cylindrical electrode and the center electrode is decreased from the first end side toward the second end in the pulse propagation direction.

In one embodiment, the inner circumferential surface of the cylindrical electrode has the same diameter in the longitudinal direction, the center electrode is a rod-shaped member, the diameter of the cylindrical circumferential surface of the center electrode is increased in the pulse propagation direction, and the cylindrical circumferential surface of the center electrode has a tapered shape or a slanted shape so as to be gradually close to the inner circumferential surface of the cylindrical electrode (FIG. 14).

In one embodiment, the inner circumferential surface of the cylindrical electrode has the same diameter in the longitudinal direction, the center electrode is configured with an axial portion (axial portion 2') extending in the longitudinal direction of the cylindrical electrode and a plurality of protrusion portions (needle-shaped portions 20) extending over the longitudinal direction of the axial portion and in the radial direction from the axial portion as a center thereof toward the inner circumferential surface of the cylindrical electrode, and the protrusion size of the protrusion portion from the axial portion is gradually increased in the pulse propagation direction(FIG. 15).

The technical ideas relating to the embodiments of FIGS. 11(A) and 11(B), 12(A) and 12(B), and 13(A) and 13(B) can be described as follows:

In an electrode pair including an outer electrode configured with a cylindrical electrode and a center electrode extending in a longitudinal direction of the cylindrical electrode in an inner space of the cylindrical electrode, the center electrode has a first end and a second end, a pulse input to the first end side propagates toward the second end, the second end is an open end, and the distance between the inner circumferential surface of the cylindrical electrode and the center electrode is gradually decreased from the first end side in the pulse propagation direction down to a predetermined portion of the center electrode, and the distance is gradually increased from the predetermined portion toward the second end.

In one embodiment, the center electrode is a line-shaped or rod-shaped member made of a wire or a rod, and the diameter of the cylindrical electrode in the inner circumferential surface is gradually decreased from the first end side in the pulse propagation direction down to a predetermined portion of the center electrode, and the diameter is gradually increased from the predetermined portion toward the second end (FIGS. 11(A) and 11(B), 12(A) and 12(B), and 13(A) and 13(B)). In the embodiments of FIGS. 11(A) and 11(B) and FIGS. 12(A) and 12(B), the cylindrical electrode 1 has an overall concave shape where the smallest diameter exists in the middle portion in the longitudinal direction, and in the embodiments of FIGS. 13(A) and 13(B), the outer circumferential surface of the cylindrical electrode has the same diameter in the longitudinal direction.

If FIGS. 11(A) and 11(B) are described as an example, the pulse incident from the pulse power source loses the energy while the pulse propagates through the center electrode 2, and the pulse is reflected on the second end, so that the pulse obtains large energy in the vicinity of the second end again. Therefore, by adjusting the distance between the outer electrode 1 and the center electrode 2 according to the energy distribution of the pulse, the energy of the pulse can be efficiently used, so that the length of the outer electrode 1 can be set to be larger, so that the water to be treated sprayed into the outer electrode 1 has a long stay time inside the outer electrode 1 and it is possible to obtain a higher treatment efficiency.

The technical ideas relating to the embodiments of FIGS. 16 and 17 can be describe as follows:

In an electrode pair including an outer electrode configured with a cylindrical electrode and a center electrode extending in a longitudinal direction of the cylindrical electrode in an inner space of the cylindrical electrode, the center electrode has a first end and a second end, a pulse input to the first end side propagates toward the second end, and a ratio b/a of an inner diameter "b" of the cylindrical electrode to an outer diameter "a" of the center electrode in a middle portion of the center electrode in the longitudinal direction is higher than the ratios in the first end side and the second end side.

In other words, in the embodiments illustrated in FIGS. 16 and 17, the discharge space formed between the cylindrical electrode and the center electrode is configured with a first portion of which diameter is decreased from the first end side in the pulse propagation direction down to the middle portion of the center electrode in the longitudinal direction and a second portion of which diameter is increased from the middle portion toward the second end side.

In one embodiment, the inner circumferential surface of the cylindrical electrode has the same diameter in the longitudinal direction, and the center electrode is a rod-shaped member, the diameter of the center electrode in the outer circumferential surface is gradually decreased from the both end sides toward the central portion so that the outer circumferential surface of the center electrode is recessed in the middle portion of the center electrode in the longitudinal direction (FIG. 16).

In one embodiment, the inner circumferential surface of the cylindrical electrode has the same diameter in the longitudinal direction, the center electrode is configured with an axial portion (axial portion 2') extending in the longitudinal direction of the cylindrical electrode and a plurality of protrusion portions (needle-shaped portions 20) extending over the longitudinal direction of the axial portion and in the radial direction from the axial portion as a center thereof toward the inner circumferential surface of the cylindrical electrode, and the protrusion size of the protrusion portion from the axial portion is gradually decreased from the both end sides toward the central portion, so that the middle portion of the center electrode in the longitudinal direction is recessed as a whole (FIG. 17).

In FIGS. 9 to 17, the vertical-type discharge electrode portions extending in the height direction are illustrated. However, the electrode pair is not limited to the electrode pair of which longitudinal direction is the vertical direction, but an electrode pair extending in a direction slanted with respect to the vertical axis or an electrode pair extending in a direction slanted with respect to the horizontal direction may be used.

Although the present invention is intended to target the organic-substance-containing water, the configurations of the electrode pairs illustrated in FIGS. 9 to 17 are applied in general to the treatment apparatuses employing discharge with a pulse power source. In addition, the treatment object is not limited to liquid, but the present invention can be applied in general to fluids including gas.

The invention claimed is:

1. A method for treating oilfield water comprising:
removing an oil content and a solid content from the oilfield water to obtain primary treated water containing organic materials;
decomposing the organic materials by exposing said primary treated water to a nanosecond discharge plasma wherein said discharge plasma is generated by a nanosecond pulse power source providing a pulse having a pulse width of 10 ns or less and a voltage rising speed of 10 kV/ns or more.

2. The method of claim 1, said decomposing repeating the steps of:
spraying the primary treated water into the nanosecond discharge plasma;
collecting the primary treated water which is sprayed and exposed to the nanosecond discharge plasma, and
spraying the collected primary treated water into the nanosecond discharge plasma.

3. The method of claim 2 wherein said primary treated water and said collected primary treated water are sprayed into the nanosecond discharge plasma together with an oxygen containing gas.

* * * * *